(12) United States Patent
Alexander et al.

(10) Patent No.: US 9,191,117 B2
(45) Date of Patent: Nov. 17, 2015

(54) HIGH-SPEED OPTICAL TRANSPONDER SYSTEMS

(75) Inventors: Stephen B. Alexander, Annapolis, MD (US); Michael Y. Frankel, Baltimore, MD (US); Steve W. Chaddick, Atlanta, GA (US); Roy C. Litz, Freeland, MD (US); Cecil D. Smith, Woodbine, MD (US)

(73) Assignee: Ciena Corporation, Hanover, MD (US)

( * ) Notice: Subject to any disclaimer, the term of this patent is extended or adjusted under 35 U.S.C. 154(b) by 599 days.

(21) Appl. No.: 12/889,158

(22) Filed: Sep. 23, 2010

(65) Prior Publication Data

US 2011/0013911 A1  Jan. 20, 2011

Related U.S. Application Data

(60) Continuation-in-part of application No. 12/862,419, filed on Aug. 24, 2010, now Pat. No. 8,306,424, and a continuation-in-part of application No. 12/099,479, filed on Apr. 8, 2008, now Pat. No. 7,809,270, which is (Continued)

(51) Int. Cl.
*H04J 14/02* (2006.01)
*H04B 10/29* (2013.01)
(Continued)

(52) U.S. Cl.
CPC .............. *H04B 10/29* (2013.01); *H04J 3/1605* (2013.01); *H04J 14/02* (2013.01); *H04J 14/0279* (2013.01);
(Continued)

(58) Field of Classification Search
CPC ............... H04B 10/504; H04B 10/505; H04B 10/5051; H04B 10/5053; H04B 10/5055; H04B 10/50572; H04B 10/50575; H04B 10/50593; H04B 10/50595; H04B 10/506; H04B 10/54; H04B 14/002; H04B 14/004; H04B 14/06; H04B 10/5161; H04B 10/572; H04B 2001/0491; H04B 10/29; H04J 3/1605; H04J 14/02; H04J 14/0279; H04J 14/06; H04J 14/0221; H04J 14/0227; H04J 14/0273; H04L 1/0045
USPC .......................... 398/135–139, 33–74, 79, 82
See application file for complete search history.

(56) References Cited

U.S. PATENT DOCUMENTS 4,641,371 A  2/1987 Shutterly
4,677,618 A  6/1987 Haas et al.
(Continued)

FOREIGN PATENT DOCUMENTS

EP  0310058 A3  9/1988
EP  0436292 A2  11/1990
(Continued)

OTHER PUBLICATIONS

Stephen B. Alexander et al. ("A Precompetitive Consortium on Wide-Band All-Optical Networks", Journal of Lightwave Technology, vol. 11, No. 5/6, May/Jun. 1993).*
(Continued)

*Primary Examiner* — M. R. Sedighian
(74) *Attorney, Agent, or Firm* — Clements Bernard PLLC; Christopher L. Bernard; Lawrence A. Baratta, Jr.

(57) ABSTRACT

The present disclosure provides high-speed wavelength division multiplexing (WDM) transponders (e.g., 10 Gb/s, 40 Gb/s, 100 Gb/s, and beyond) that receive one or more optical signals and convert and/or remodulate the received optical signals onto a newly generated optical channel along with overhead processing/addition, forward error correction, and the like. In general, the transponders of the present invention include a client-side and a line-side, each with bi-directional optical transmission. The transponders provide an effective mechanism to support WDM networks that are transparent to the client-side.

17 Claims, 11 Drawing Sheets

Related U.S. Application Data a continuation of application No. 10/618,684, filed on Jul. 15, 2003, now Pat. No. 7,369,780, which is a continuation of application No. 09/793,645, filed on Feb. 26, 2001, now Pat. No. 6,618,176, which is a continuation of application No. 09/428,420, filed on Oct. 28, 1999, now Pat. No. 6,233,077, which is a division of application No. 08/955,058, filed on Oct. 21, 1997, now abandoned, which is a continuation-in-part of application No. 08/669,049, filed on Jun. 24, 1996, now Pat. No. 5,715,076, which is a continuation-in-part of application No. 08/624,269, filed on Mar. 29, 1996, now Pat. No. 5,726,784, which is a continuation-in-part of application No. 08/438,844, filed on May 11, 1995, now Pat. No. 5,504,609, application No. 12/889,158, which is a continuation-in-part of application No. 12/166,537, filed on Jul. 2, 2008.

(60) Provisional application No. 60/950,032, filed on Jul. 16, 2007.

(51) Int. Cl.
 H04J 3/16 (2006.01)
 H04J 14/06 (2006.01)
 H04L 1/00 (2006.01)

(52) U.S. Cl.
 CPC ............. H04J 14/06 (2013.01); *H04J 14/0221* (2013.01); *H04J 14/0227* (2013.01); *H04J 14/0273* (2013.01); *H04L 1/0045* (2013.01)

(56) References Cited

U.S. PATENT DOCUMENTS

| | | | |
|---|---|---|---|
| 4,736,120 A | 4/1988 | Foster | |
| 4,807,222 A * | 2/1989 | Amitay | 398/99 |
| 4,807,227 A | 2/1989 | Fujiware et al. | |
| 4,886,334 A | 12/1989 | Aoki | |
| 4,933,929 A * | 6/1990 | Tajima | 398/91 |
| 4,945,531 A | 7/1990 | Suzuki | |
| 4,955,014 A * | 9/1990 | Kuppers et al. | 398/42 |
| 4,957,339 A * | 9/1990 | Fussganger et al. | 398/82 |
| 4,989,199 A | 1/1991 | Rzeszewski | |
| 5,005,936 A * | 4/1991 | Hsu | 398/79 |
| 5,050,952 A | 9/1991 | Fussgager | |
| 5,065,396 A | 11/1991 | Castellano et al. | |
| 5,140,456 A | 8/1992 | Huber | |
| 5,157,530 A | 10/1992 | Loeb et al. | |
| 5,166,821 A | 11/1992 | Huber | |
| 5,185,736 A | 2/1993 | Tyrrell et al. | |
| 5,200,964 A | 4/1993 | Huber | |
| 5,218,465 A * | 6/1993 | Lebby et al. | 398/19 |
| 5,257,124 A | 10/1993 | Glaab et al. | |
| 5,267,073 A | 11/1993 | Tamburello et al. | |
| 5,271,024 A | 12/1993 | Huber | |
| 5,282,257 A * | 1/1994 | Ota | 385/46 |
| 5,283,686 A | 2/1994 | Huber | |
| 5,295,209 A | 3/1994 | Huber | |
| 5,321,541 A * | 6/1994 | Cohen | 398/82 |
| 5,321,543 A | 6/1994 | Huber | |
| 5,339,183 A | 8/1994 | Suzuki | |
| 5,363,229 A | 11/1994 | Sakurai et al. | |
| 5,387,927 A * | 2/1995 | Look et al. | 725/114 |
| 5,455,699 A | 10/1995 | Glance et al. | |
| 5,461,622 A | 10/1995 | Bleickardt et al. | |
| 5,465,254 A * | 11/1995 | Wilson et al. | 370/466 |
| 5,465,267 A | 11/1995 | Todoroki | |
| 5,467,212 A | 11/1995 | Huber | |
| 5,483,372 A | 1/1996 | Green, Jr. | |
| 5,487,120 A | 1/1996 | Choy et al. | |
| 5,493,625 A | 2/1996 | Glance | |
| 5,504,609 A | 4/1996 | Alexander et al. | |
| 5,510,917 A * | 4/1996 | Corke et al. | 398/34 |
| 5,532,864 A | 7/1996 | Alexander et al. | |
| 5,557,439 A | 9/1996 | Alexander et al. | |
| 5,559,910 A | 9/1996 | Taga et al. | |
| 5,561,682 A | 10/1996 | Aoki et al. | |
| 5,576,875 A * | 11/1996 | Chawki et al. | 398/72 |
| 5,600,466 A * | 2/1997 | Tsushima et al. | 398/79 |
| 5,608,571 A | 3/1997 | Epworth et al. | |
| 5,617,236 A * | 4/1997 | Wang et al. | 398/117 |
| 5,710,650 A | 1/1998 | Dugan | |
| 5,715,076 A | 2/1998 | Alexander et al. | |
| 5,774,244 A | 6/1998 | Tandon et al. | |
| 5,784,184 A | 7/1998 | Alexander et al. | |
| 5,887,039 A | 3/1999 | Suemura et al. | |
| 5,938,309 A | 8/1999 | Taylor | |
| 6,031,644 A | 2/2000 | Utsumi | |
| 6,233,077 B1 | 5/2001 | Alexander et al. | |
| 7,583,599 B1 | 9/2009 | Ling et al. | |
| 2003/0016697 A1 | 1/2003 | Jordan | |
| 2003/0091267 A1 | 5/2003 | Alvarez et al. | |
| 2004/0252720 A1 | 12/2004 | Xiong et al. | |
| 2006/0002304 A1 | 1/2006 | Ashwood-Smith | |
| 2006/0268943 A1 | 11/2006 | DeCusatis et al. | |
| 2007/0014308 A1 | 1/2007 | Gunthorpe et al. | |
| 2008/0019463 A1 | 1/2008 | Ikeuchi et al. | |

FOREIGN PATENT DOCUMENTS

| | | |
|---|---|---|
| EP | 0438022 A3 | 12/1990 |
| EP | 0488241 A2 | 11/1991 |
| GB | WO9519689 | 7/1995 |
| WO | WO9218890 | 10/1992 |

OTHER PUBLICATIONS

Shuji Suzuki et al. ("A Photonic Wavelength-Division Switching System Using Tunable Laser Diode Filters", Journal of Lightwave Technology, vol. 8, No. 5, May 1990).*

Lee Thombley et al. (Project OART-WDM, EDFAs and Mixed Data Rates in a Real-World Testbed, National Fiber Optic Engineers Conference, Jun. 13-16, 1994).*

Report of the Question 15/15 Expert Meeting, Oct. 10-12, 1994, International Telecommunication Union, pp. 4-5, (1994).

"Implementation of a Forward Error Correcting Code in Multigigabit Optical Fiber Submarine Cable Systems," International Telecommunications Union COM 125-82E pp. 1013 (1994).

Wayne D. Grover et al., "Design and Characterization of an Error-Correcting Code for the SONET STS-1 Tributary," IEEE Transactions on Communications, vol. 38, No. 4, pp. 467-476, (1990).

IEEE Journal on Selected Areas in Communications, vol. 8, No. 6, pp. 945-1222 (1990).

Akira Inoue et al., "Fabrication and Application of Fiber Bragg Grating—A Review," Optoelectronics-Devices and Technologies, vol. 10, No. 1, pp. 119-130, (1995).

W. J. Lennon et al., "High Speed Optical Links Between LLNL and Berkeley," Lawrence Livermore National Laboratory, Preprint UCRL-JC-118154, Aug. 8, 1994.

"All-Fibre Narrowband Relection Gratings at 1500nm," Electronics Letters, vol. 26, No. 11, pp. 730-731 (1990).

Ivan P. Kaminow et al., "Introduction to Electrooptic Devices," Academic Press, pp. 73 (1974).

Kuo Chen Lee et al., "Routikng and Switching in a Wavelength Convertible Optical Network," Proc. IEEE Infocom '93 (IUEEE Computer Society Press), vol. 2, pp. 578-585 (1993).

Mitchel Loeb, "Parallel Data Transmission Through an Optical Fiber Using Wavelength Division Multiplexing," North Carolina State University at Raleigh, Ph.D. Thesis (1985).

S. E. Miller et al., "Optical Fiber Telecommunications II," Academic Press, Inc., pp. 16-18 (1988).

Jonathan A. Nagel et al., "Multigigabit Capacity 1.5um WDM Field Trial," OFC Technical Digest, pp. 28 (1991).

H. Okamura, "Forward Error Correction for SDH Systems with Line Amplifiers, Including WDM," International Telecommunication Union, COM 15-148-E, pp. 1-4 (1994).

David N. Payne, "Advances in Fibre Devices," OFC/IOOC Technical Digest Series, vol. 4, pp. 394-397 (1993).

(56) References Cited

OTHER PUBLICATIONS

Pirelli, "T31 Multiwavelength Optical Amplifiers System" Doc. 200-305-001, Issue 1, Mar. 1995.
Catherine M. Ragdale et al., "Narrow and Fiber Grating Filters," IEEE Journal Select. Areas in Communic., vol. 8, No. 6, pp. 1146-1150 (1990).
Rajib Ramaswami, "Multiwavelength LIghtwave Networks for Computer Communication," IEEE Communications Magazine, vol. 31, No. 2, pp. 78-88, (1993).
D. W. Smith et al., "Optical Processing in Future Coherent Networks," IEEE Global Telecommunications Conference, vol. 1, pp. 18.21-18.2.6 (1987).
W. V. Sorin et al., Tunable Single-mode Fiber Reflective Grating Filter, GFC/I))C '87 Technical Digest, paper #THBR, pp. 194, Jan. 1987.
C. Stenstrom, Draft recommendation G.ECSS: "Forward Error Correction for Submarine Systems" International Telecommunication Union, CDOM 15-199-E, pp. 1-11 Sep. 1995.
T. Tamir et al., "Guided-Wave Optoelectronics," New York: Springer-Verlag, pp. 145, 153, 182, 183, 317, 372, 382 (1988).
TSB, "Report of Working Party 4/15 (Optical Transmission)," International Telecommunications Union, COM 15R35-E, pp. 1, 194-205 (Mar. 1995).
TSB, Part II.B of the Report of Working Party 4/15 (Optical Transmission, International Telecommunications Union, COM-15-R49-E, pp. 1, 85-96 (Dec. 1995).
Djimitri Wiggert, Ph.D., "Error-Control Coding and Applications," Artech House, Inc., (1978).
European Patent Office Search Report dated Apr. 6, 2005.
European Patent Office Search Report dated Jul. 14, 2005.
"Forwarding Error Correcting Codes in Synchronous Fiber Optic Gtransmission Systems", Journal of Lightwave Technology, vol. 15, No. 1, Jan. 1997.
S. B. Alexander et al.; "A Precompetitive Consortium on Wide-Band All-Optical Networks", May 1993, pp. 714-732, vol. 11, No. 5/6, Journal of Lightwave Technology, New York, USA.
T. E. Stern et al., "Linear Lightwave Networks; Performance Issues", May 1993, pp. 937-950, vol. 11, No. 5/6, Journal of Lightwave Technology, XP218892, New York, USA.
T. E. Stern, "Linear Lightwave Networks; how far can they go?", Dec. 2-5, 1990, pp. 1866-1872, vol. 3, IEEE Global Telecommunications Conference Record, XP337910, San Diego, USA.
S. S. Wagner et al., "Multiwavelength Ring Networks for Switch Consolidation and Interconnection", Jun. 14-18, 1992, pp. 1173-1179, vol. 3, International Conference on Communications, XP337910, Chicago, USA.
G. R. Hill, "A Wavelength Routing Approach to Optical Communications Networks", Mar. 29-21, 1988, pp. 354-362, Proceedings, Seventh Annual Joint Conference of the IEEE Computer and Communication Societies, Infocom '88, XP44787, New Orleans, USA.
M. S. Goodman et al., "The LAMBDANET Multiwavelength Network; Architecture, Applications, and Demonstrations", Aug. 1990, pp. 995-1004, IEEE Journal on Selected Areas in Communications, vol. 8, No. 6, XP471589, New York, USA.
Tomizawa M et al., "Forward Error Correcting Codes in Synchronous Fiber Optic Transmission Systems", Jan. 1997, pp. 43-51, Journal of Lightwave Technology, vol. 15, No. 1, XP000642276.
Ogata et al., OFC '96 Technical Digest, Tul2, pp. 42-44.
Suzuki et al., Journal of Lightwave Technology, vol. 8, No. 5, pp. 660-665, May 1990.
Thombley et al., 10th Annual National Fiber Optical Engineers Conference, Jun. 12-16, 1994, pp. 283-294.
Aoki et al., ACOFT '95, pp. 355-358.
Chen, Proc. IEEE, vol. 58, No. 120, Oct. 1970, pp. 1440-1457.
Gower, Ed., Optical Communication System, (Prentice Hall, NY), C. 1993, pp. 1-25.
Desurvire, Erbium-Doped Fiber Amplifiers, (John Wiley & Sons, NY), c. 1994, pp. 568-575.
Bjarklev, Optical Fiber Amplifiers, (Artech House, Boston), c. 1993, pp. 193-233.
Becker, IEEE J. Quantum Elec., vol. QE-20, No. 7, Jul. 1984, pp. 723-727.
Fan et al., Optics & Photonics News, Feb. 1995, pp. 26-32.
Morey et al., Optics and Photonics News, Feb. 1994, pp. 8-14.
Wood, J. Lightwave Tech., vol. 6, No. 6, Jun. 1988, pp. 743-757.
M. Tomizawa et al., "Forward Error Correcting Codes in Synchronous Fiber Optics Transmission Systems", Journal of Lightwave Technology, vol. 15, No. 1, Jan. 1997, pp. 43-51.
G. Jeong et al., "Long-Distance Parallel Data Link Using WDM Transmission with Bit-skew Compensation", Journal of Lightwave Technology, vol. 14, No. 5, May 1996, pp. 655-660.
Show-Kuo, Shao et al., "WDM Coding for High-Capacity Lightwave Systems", Journal of Lightwave Technology, vol. 12, No. 1, Jan. 1994, pp. 137-148.
S. Sian et al., "40GBIT/S (16×2.5GBIT/S) Unrepeatered Transmission Over 427KM", Electronics Letters, vol. 32, No. 1, Jan. 1996, pp. 50-51.
D. M. Castagnozzi et al., "High Data Rate Error Correcting Coding", SPIE International Symposium OE/LASE Jan. 27, 1994, Los Angeles, CA, paper 2123-37.
D. M. Castagnozzi et al., "Performance of a 1 Gbit/s Optically Preamplified Communication System with Error Correcting Coding", Electronics Letters, vol. 30, No. 1, pp. 65-66, 1994.
J. L. Pamart et al., "Forward Error Correction in a 5 Gbit/s 6400 km EDFA Based System", Electronics Letters, vol. 30, No. 4, pp. 342-343, 1994.
S. Yamamoto et al., "BER Performance by Forward Error Correcting Code in 5 Gbit/s 9000 km EDFA Transmission System", Electronics Letters, vol. 30, No. 9, pp. 718-719, 1994.
P. B. Hansen et al., "520km Unrepeatered Transmission at 2.488 Gbit/s Using Dispersion Compensation, Forward Error Correction, and Remote Post and Pre-amplifiers Pumped by Diods-pumped Raman Lasers", Electronics Letters, vol. 31, No. 17, pp. 1460-1461m 1995.
M. Tomizawa et al., "STM-64 Linerly Repeatered Optical Transmission Experiment Using Forward Error Correcting Codes", Electronics Letters, vol. 31, No. 12, pp. 1001-1002, 1995.
Robert A. Cryan, "Performance of an Optically Preamplified System with Error Correction", IEEE International Conference on Communication Systems, Singapore, pp. 173-176, 1994.
J. L. Pamart et al., "Using Forward Error Correcting in a 5 Gbit/s 6400 km EDRA Based System", OFC, 1994.
D. M. Castagnozzi et al., "High Data Rate Error Correcting Coding", SPIE Symposium-Free Space Laser Communications, 1994.
P. M. Gabla et al., "401 km, 722 mb/s and 357 km, 2-488 Gb/s IM/DD Repeaterless Transmission Experiments Using Erbium-Doped Fiber Amplifiers and error Correcting Code", IEEE Photonics Technology Letters, vol. 4, vol. 10, pp. 1148-1151, 1992.
Wu Jhy-Horng et al., "Coding to Improve Receiver Sensitivity for the Optical Intensity Modulation Direct-Detection System", Journal of Optical Communications, vol. 14, pp. 217-222, 1993.
S. Yamamoto et al., "5 Gbit/s Optical Transmission Terminal Equipment Using Forward Error Correcting Code and Optical Amplifier", Electronics Letters, vol. 30, No. 3, pp. 254-255, 1994.
M. S. Summerfield et al., "All-optical TDM to WDM Conversion in a Semiconductor Optical Amplifier", Electronics Letters, vol. 30, No. 3, pp. 255, 1994
J. C. Livas et al., "Forward Error Correction in a 1 Gbit/S/Channel Wavelength-Division-Multiplexed System", Proc. IEEE/LEOS Summer Topical on Optical Networks and Their Enabling Technologies, paper #W2.5, pp. 61-62, Jul. 1994, Abstract.
R. A. Cryan, A Reed-Solomon Coded Optically Preamplified PPM System, Microwave and Optical Technology Letter, vol. 9, No. 3, 1995.
"1993 Technical Digest Series, vol. 4, Post Conference Edition," Conference on Optical Fiber Communication/International Conference on Integrated Optics and Optical Fiber Communication, pp. 335-337, (1993).
"Sonet Inter-Carrier Interface Physical Layer Generic Criteria for carriers," GR-1374-Core, Issue 1, (1994).
"Sonet Regenerator (SONET RGTR) Equipment Generic Criteria," TR-NWT-000917, Issue 1, (1990).

(56) References Cited

OTHER PUBLICATIONS

"Synchronous Optical Network (SONET) Transport Systems: Common Generic Criteria," GR-253-Core, Issue 1, (1994).
F. Bilodeau et al., "High-Return-Loss Narrowband All-Fiber Bandpass Bragg Transmission Filter", IEEE Photonics Technology Letters, vol. 6, No. 1, 1994, pp. 80-82.
D. A. Bryan et al., "Integral Grating Coupler on an Optical Fiber," SPIE vol. 574, Fiber Optic Couplers, Connectors, and Splice Technology II, pp. 56-61 (1985).
Michael Corke, "Wavelength Division Multiplexers; Requirements, Installation and Testing", The 10th Annual National Fiber Optic Engineers Conference, vol. 4, pp. 79-94 (1994).
F. Diner et al., Network Design Consideration of n-channel WDM Architectrus with EDFAs for Central Office Applications, National Fiber Optic Engineers Conf., pp. 1207-1214, Jun. 18-22, 1995.
Jay Duncanson, "Inverse Multiplexing," IEEE Communications Magazine, pp. 35-41, (1994).

* cited by examiner

HIGH-SPEED OPTICAL TRANSPONDER SYSTEMS

CROSS-REFERENCE TO RELATED APPLICATION(S)

This application is a continuation-in-part of U.S. patent application Ser. No. 12/099,479 filed Apr. 8, 2008 and of U.S. patent application Ser. No. 12/862,419 filed Aug. 24, 2010, which is a continuation of U.S. patent application Ser. No. 10/618,684 filed Jul. 15, 2003, now U.S. Pat. No. 7,369,780 issued May 6, 2008, which is a continuation of U.S. patent application Ser. No. 09/793,645 filed Feb. 26, 2001, now U.S. Pat. No. 6,618,176, issued Sep. 9, 2003, which is a continuation of U.S. patent application Ser. No. 09/428,420 filed Oct. 28, 1999, now U.S. Pat. No. 6,233,077, issued May 15, 2001, which is a divisional of U.S. patent application Ser. No. 08/955,058, filed Oct. 21, 1997, now abandoned, which is a continuation-in-part of U.S. patent application Ser. No. 08/669,049 filed Jun. 24, 1996, now U.S. Pat. No. 5,715,076, issued Feb. 3, 1998, which is a continuation-in-part of U.S. patent application Ser. No. 08/624,269, filed Mar. 29, 1996, now U.S. Pat. No. 5,726,784, issued Mar. 10, 1998, which is a continuation-in-part of U.S. patent application Ser. No. 08/438,844, filed May 11, 1995, now U.S. Pat. No. 5,504,609, issued Apr. 2, 1996, the disclosures of which are incorporated by reference herein. This application is also a continuation-in-part of U.S. patent application Ser. No. 12/166,537 filed Jul. 2, 2008 which claims priority to U.S. provisional patent application Ser. No. 60/950,032 filed Aug. 15, 2007, the disclosures of which are incorporated by reference herein.

FIELD OF THE INVENTION

The present invention relates to wavelength division multiplexing (WDM) optical communications systems. More particularly, the present invention relates to high-speed WDM transponders (e.g., 10 Gb/s, 40 Gb/s, 100 Gb/s, and beyond) that receive one or more signals and convert and/or remodulate the received signals onto a newly generated optical signal along with encapsulation, overhead processing, forward error correction, and the like.

BACKGROUND OF THE INVENTION

As networks proliferate and data demands increase, there are ongoing requirements for network operators to increase bandwidth. In particular, optical networks are experiencing rapidly increasing growth of capacity. As described herein, optical networks may include metro or campus networks, regional networks, long haul or core networks, ultra-long haul or all-optical networks, and the like. Optical network capacity growth is reflected by individual channel data rate scaling from 10 Gb/s to 40 Gb/s to 100 Gb/s and beyond. In addition to individual channel data rate scaling, WDM has been used as an approach for increasing the capacity of optical networks. In a WDM system, plural optical signal channels are carried over a single waveguide, each channel being assigned a particular wavelength. Through the use of optical amplifiers, such as erbium doped fiber amplifiers (EDFAs), Raman amplifiers, and the like, plural optical channels may be directly amplified simultaneously, facilitating cost effective use of WDM in optical networks. For efficient network operation and implementation, there is a need in the art for WDM systems which can both interface one or more client-side signals to a line-side signal with the line-side signal formatted, modulated, demarcated, and placed at a particular wavelength for high-speed WDM applications.

BRIEF SUMMARY OF THE INVENTION

In an exemplary embodiment, an optical system includes an optical transponder including a client-side and a line-side. Optionally, the client-side operates a first protocol and the line-side operates a second protocol, and wherein the optical transponder is configured to demarcate the second protocol from the first protocol. The first protocol may be any of SONET, SDH, OTN, ATM, Ethernet, and Fibre Channel, and wherein the second protocol may be any of SONET, SDH, OTN, and Ethernet. Alternatively, the client-side includes a network element operating at any of layer one, layer two, and/or layer three, and wherein the line-side forms a dense wave division multiplexing layer separate from the layer one, layer two, and/or layer three. The client-side includes a first transmitter operably connected to a client-side receiver and a first receiver operably connected to a client-side transmitter; and wherein the line-side includes a second transmitter operably connected to a wave division multiplexing component and a second receiver operably connected to the wave division multiplexing component or to another wave division multiplexing component. The optical system may further include circuitry communicatively coupling the client-side and the line-side; wherein the circuitry is configured to re-shape, re-time, and/or re-amplify a signal therebetween. The optical system may further include circuitry communicatively coupling the client-side and the line-side; wherein the circuitry is configured to perform one or more of: remodulate a signal between the client-side and the line-side; process overhead data on the signal; and perform forward error correction on the signal. Optionally, the second transmitter may include an optical modulator, a laser, and a wavelength control device configured to maintain wavelength accuracy of the laser. Alternatively, the second transmitter and the second receiver utilize quadrature amplitude modulation. Also, the second transmitter and the second receiver may utilize quadrature amplitude modulation and polarization multiplexing. The circuitry may be formed as a single integrated circuit, and wherein the single integrated circuit further includes one or more of the first transmitter, the first receiver, the second transmitter, and the second receiver. The single integrated circuit may include CMOS and a laser associated with the first transmitter and a laser associated with the second transmitter are each external to the CMOS. Optionally, the single integrated circuit further includes one or more additional optical transponders. The circuitry is further configured to frame an information-bearing signal between the client-side and the line-side with an OTN frame. The circuitry may be further configured to process forward error correction in the OTN frame.

In another exemplary embodiment, a plurality of high-speed optical transponders include a plurality of client-side interfaces each connecting to client-side devices; a plurality of a line-side interfaces each connecting to line-side devices; and circuitry connecting each of the plurality of client-side interfaces with a respective one of the plurality of line-side interfaces for exchanging signals therebetween. The plurality of high-speed optical transponders may further include a single integrated circuit forming each of the plurality of client-side interfaces, the plurality of a line-side interfaces, and the circuitry. The single integrated circuit may include CMOS and lasers associated with each of the plurality of client-side interfaces and the plurality of a line-side interfaces are external to the CMOS.

In yet another exemplary embodiment, an optical system includes a client interface receiving a signal; and a coherent modulation/demodulation system configured to convert the signal to a wave division multiplexing (WDM) signal. The optical system may further include polarization multiplexing devices in the coherent modulation/demodulation system supporting polarization modulation on an optical signal.

BRIEF DESCRIPTION OF THE DRAWINGS

The present invention is illustrated and described herein with reference to the various drawings of exemplary embodiments, in which like reference numbers denote like system components, respectively, and in which.

DETAILED DESCRIPTION OF THE INVENTION

Figure 1A:
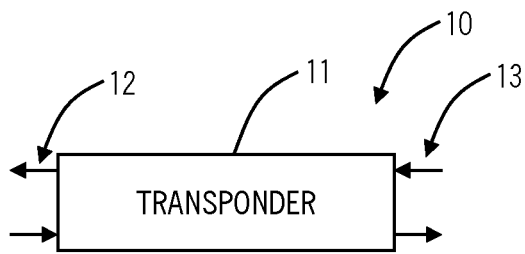
FIGS. 1A and 1B are block diagrams of optical transponders with a client-side and a line-side.
Figure 1B:
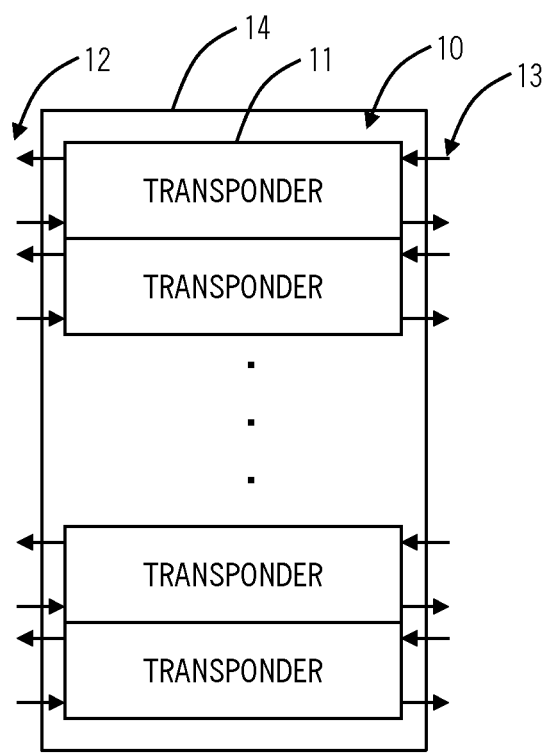

Referring to FIGS. 1A and 1B, in exemplary embodiments, an optical transponder 10 is an optical device 11 with a client-side 12 and a line-side 13. Each of the client-side 12 and the line-side 13 include optical interfaces that are communicatively coupled with external devices, components, etc. not shown in FIGS. 1A and 1B. For example, the client-side 12 may be communicatively coupled to a network element including, but not limited to, any of a SONET/SDH device, an Ethernet Switch, an Internet Protocol (IP) router, an optical switch, a digital or optical cross-connect, or the like. The line-side 13 may be communicatively coupled to a variety of WDM components including, but not limited to, any of a WDM coupler, multiplexer, filter, wavelength selective switch (WSS), optical add-drop multiplexer (OADM), reconfigurable OADM, or the like. FIG. 1A illustrates the optical transponder 10 as the single device 11, i.e. a single client-side 12 and a line-side 13. For example, the single device 11 may include a line card, module, blade, single circuit, or the like including various electrical and optical components as well as mechanical components for physical interfaces of the client-side 12 and the line-side 13. FIG. 1B illustrates a plurality of optical transponders 10 integrated into a single device 14, i.e. a plurality of client-sides 12 and a plurality of line-sides 13. For example, the single device 14 may include a line card, module, blade, single circuit, or the like including various electrical and optical components as well as mechanical components for a plurality of physical interfaces of the client-sides 12 and the line-sides 13.

Functionally, the optical transponder 10 is configured to interface, in a bi-directional manner, the client-side 12 with the line-side 13 providing an information-bearing signal therebetween while also providing various functions to facilitate WDM. For example, these functions may include (1) remodulating the information-bearing signal between the client-side 12 and the line-side 13; (2) processing of overhead data between the client-side 12 and the line-side 13; (3) optionally providing protocol encapsulation between the client-side 12 and the line-side 13; (4) optionally providing forward error correction (FEC) processing on the client-side 12 and/or the line-side 13; (5) providing multiplexing of a plurality of information-bearing signals from the client-side 12 into a single signal on the line-side 13; and the like. Specifically, the devices 11, 14 include a variety of electrical circuits, optoelectronics, optical modules, and the like to facilitate these various functions.

One of the functional aspects of the optical transponder 10 includes remodulation from the client-side 12 to the line-side 13. A client-side network associated with the client-side 12 may use different modulation, line-encoding, protocols, and the like from a line-side network associated with the line-side 13. For example, the client-side network may be optimized for lower cost, reach, etc. to provide intra-office connectivity or short-reach over a metro or campus network. The line-side network may be optimized for longer reach, non-linear effect mitigation, chromatic and polarization mode dispersion tolerance, and the like for transmission over a metro, regional, or long-haul network. The optical transponder 10 includes various electrical and optical devices and circuits that convert the information-bearing signal from the client-side 12 to an optical signal at one of a plurality of WDM wavelengths on the line-side 13. For example, the client-side 12 may include short-reach, non-return-to-zero (NRZ), on-off keying (OOK), 1310 nm, etc. whereas the line-side 13 may include non-return-to-zero (NRZ), return-to-zero (RZ)-OOK, duo-binary, quadrature amplitude modulation (QAM), RZ-differential phase shift keying (DPSK), RZ-differential quadrature phase shift keying (DQPSK), Orthogonal frequency-division multiplexing (OFDM), polarization multiplexing, 15XX.XX nm WDM wavelength, etc. Advantageously, the optical transponder 10 allows optical formatting as appropriate for each of the client-side 12 and the line-side 13. Further, the line-side 13 may also include electrical signal processing circuitry that may provide electrical domain mitigation of chromatic dispersion, polarization mode dispersion, and other non-linear effects.

Additional functional aspects of the optical transponder may include processing of overhead data between the client-side 12 with the line-side 13 and optionally providing protocol encapsulation between the client-side 12 with the line-side 13. From a high-level perspective, the optical transponder 10 is configured to demarcate the client-side network from the line-side network while providing the information-bearing signal therebetween. That is, the optical transponder 10 effectively may create a new, physical layer separate and distinct from a physical layer associated with the client-side network, that may be referred to as a WDM layer. This may be logically viewed as layer-zero on the Open Systems Interconnection (OSI) model (e.g., with layer-one considered SONET, SDH, Optical Transport Network (OTN), layer-two considered Ethernet, layer-three considered IP, etc.). The client-side 12 may include a first protocol, such as, but not limited to, SONET, SDH, OTN, Ethernet, ATM, Fibre Channel, and the like. The line-side 13 may include a second protocol, such as, but not limited to, SONET, SDH, OTN, and the like. Further, the first protocol may be the same as or different as the second protocol. Importantly, the optical transponder 10 is functionally a network element device that demarcates the first protocol from the second protocol thereby defining the WDM layer.

In an exemplary embodiment, the client-side 12 may include SONET/SDH while the line-side 13 may also include SONET/SDH, i.e. the first protocol is the same as the second protocol. Here, the optical transponder 10 is configured to provide 3R functionality including retiming, reamplify, and reshaping the information-bearing signal between the client-side 12 and the line-side 13. This may include acting as a SONET/SDH "thin" regenerator by monitoring select overhead bytes to provide section level demarcation of the WDM layer. Further, FEC overhead may be utilized via one or more unused bytes in the SONET/SDH overhead. Advantageously in this exemplary embodiment, the optical transponder 10 provides a mechanism to demarcate the WDM layer from an associated SONET/SDH layer allowing a split between SONET/SDH network elements and WDM network elements. This split is advantageous both in system development, i.e. WDM and SONET/SDH may be developed as separate network elements with their associated hardware and software thereby decoupling the development process, and in system operation, i.e. WDM and SONET/SDH include demarcation for fault isolation and other operations, administration, maintenance, and provisioning (OAM&P) functions.

In another exemplary embodiment, the line-side 13 may include OTN and the client-side 12 may include any other protocol (e.g., SONET/SDH, Ethernet, ATM, Fibre Channel, etc.) that is transparently encapsulated in OTN. ITU-T defines Optical Transport Network (OTN) as a set of Optical Network Elements connected by optical fiber links, able to provide functionality of transport, multiplexing, routing, management, supervision and survivability of optical channels carrying client signals. Of note, OTN is defined in: ITU-T G.709 "Interfaces for the optical transport network (OTN)"; ITU-T G.798 "Characteristics of optical transport network hierarchy equipment functional blocks"; OTN Standard FEC (Called GFEC sometimes) is defined in ITU-T G.975; OTN Jitter is defined in ITU-T G.8251 "The control of jitter and wander within the optical transport network (OTN)"; ITU-T G.870 "Terms and definitions for Optical Transport Networks (OTN)"; ITU-T G.871 "Framework for optical transport network Recommendations"; ITU-T G.873.1 "Optical Transport Network (OTN): Linear protection"; ITU-T G.874 "Management aspects of the optical transport network element"; ITU-T G.874.1 "Optical transport network (OTN): Protocol-neutral management information model for the network element view"; ITU-T G.959.1 "Optical transport network physical layer interfaces"; ITU-T G.8201 "Error performance parameters and objectives for multi-operator international paths within the Optical Transport Network (OTN)"; and the like. In this exemplary embodiment, the optical transponder 10 is configured to receive the client-side 12 and to encapsulate this in an OTN frame for the line-side 13 and to receive the line-side 13 and to strip off the OTN frame for the client-side 12. Thus, the optical transponder 10 may include various circuits to process OTN overhead and to provide FEC within the OTN overhead.

Figure 2:
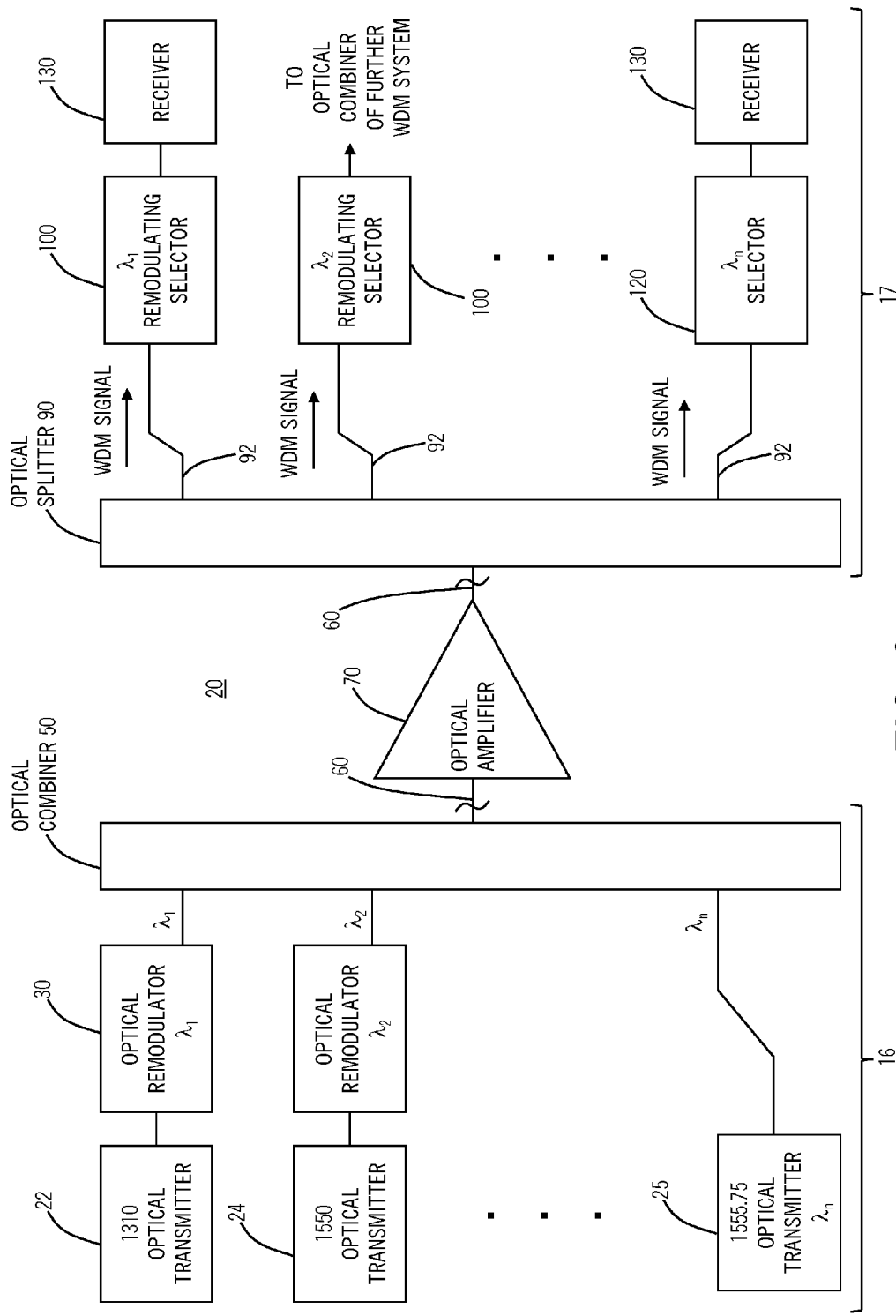
FIG. 2 is a diagram of an optical communication system employing remodulating channel selectors.

Referring to FIG. 2, in an exemplary embodiment, an optical communication system 20 is illustrated. The optical communication system 20 illustrates use of the optical transponders 10 in a network from a single direction perspective. That is, the optical communication system 20 illustrates unidirectional transmission from a first node 16 to a second node 17. Those of ordinary skill in the art will recognize that a second set of equipment may be included in the optical communication system 20 to provide bidirectional transmission therebetween. The optical communication system 20 operates to take optical transmission signals from diverse optical transmitters 22, 24, 25 and other optical signal sources and map the signal sources onto a WDM system, i.e., a communication system in which individual optical signals correspond to optical channels within a WDM optical signal carried on an optical waveguide. The optical communication system 20 includes a first set of one or more optical transmitters 22, 24, each optical transmitter emitting an information-bearing optical signal at a first transmission wavelength. The first set of one or more optical transmitters 22, 24 is part of the client-side network of the optical transponder 10.

The optical transmitters 22 and 24 generally include a directly-modulated laser, such as a DFB semiconductor laser, for creation of an information-bearing optical transmission signal. In an exemplary embodiment, the optical transmitters 22 and 24 may be 2.5 G, 10 G, 40 G, etc. transmitters using SONET/SDH, Ethernet, OTN, Fibre Channel, etc. When plural optical transmitters are provided, the transmission wavelength of each transmitter may be the same or different. Because the transmitters 22 and 24 may form part of an existing optical system, a wide variety of transmitters emitting in a broad range of wavelengths can be accommodated in the optical communication system 20 of the present invention, thus ensuring compatibility with currently-deployed transmission equipment. Typical transmission elements emit wavelengths ranging from about 1300 to 1600 nm. In the depicted exemplary embodiment, the optical transmitter 22 is a 1310 nm optical transmitter and the optical transmitter 24 is a 1550 optical transmitter.

The optical communication system 20 includes a plurality of remodulators 30 for receiving the transmitted information-bearing optical signal at transmission wavelength from the first set of optical transmitters 22, 24 and transmitting an information-bearing optical signal at a WDM optical system channel wavelength. The expression "information-bearing optical signal," as used herein, refers to an optical signal which has been coded with information, including, but not limited to, audio signals, video signals, and computer data, generally through modulation. Similarly, the expression "non-information-bearing optical signal," as used herein, relates to a CW optical signal which has not been coded with information, e.g., an optical carrier which has not been modulated. Typically, the wavelengths emitted by the remodulators 30 are selected to be within the 1500 nanometer range, the range in which the minimum signal attenuation occurs for silica-based fibers. More particularly, the wavelengths emitted by the remodulators 30 may be selected to be in the range from 1530 to 1560 nanometers (referred to as the C-band). However, other wavelength bands (e.g., L-band, S-band, etc.) may be selected according to overall system requirements. Note, the remodulators 30 are akin to the transponder 10 wherein the client-side 12 interfaces with the first set of optical transmitters 22, 24 (and associated receivers that are not show in FIG. 2) and the line-side 13 interfacing an optical combiner 50 (i.e., a coupler, filter, multiplexer/demultiplexer, etc.).

For a 16-channel WDM optical communication system, an exemplary channel plan is set forth in Table 1 below. The optical channel plan dictates both the wavelengths of the optical remodulators 30 and the corresponding wavelengths selected by the wavelength selectors in the optical receiving systems. Another exemplary channel plan is set forth in Table 2 below. Both Tables 1 and 2 include 100 GHz frequency spacing (or equivalently 0.8 nm wavelength spacing) between adjacent channels. Those of ordinary skill in the art recognize that other exemplary channel plans may be used with increased or decreased spacings, such as 200 GHz (0.16 nm), 50 GHz (0.4 nm), 25 GHz (0.2 nm), and the like. Note, the channel plan may be a function of modulation format and bit rate. For example, 10 Gb/s may support 25 GHz spacing, 40 Gb/s may support 50 GHz, and 100 Gb/s may support 100 GHz spacing. However, 100 Gb/s may not support 25 GHz or 50 GHz spacing due to channel bandwidth. Further, each of the channels plans in Table 1 and 2 may apply equally to the optical transponders 10 on the line-side 13. Further, the optical transponders 10 and the remodulators 30 may include tunable lasers that may be tuned to any number of channels or wavelengths.

TABLE 1

| Channel Number | Wavelength (nm) |
|---|---|
| 1 | 1557.36 |
| 2 | 1556.56 |
| 3 | 1555.75 |
| 4 | 1554.94 |
| 5 | 1554.13 |
| 6 | 1553.33 |
| 7 | 1552.52 |
| 8 | 1551.72 |
| 9 | 1550.92 |
| 10 | 1550.12 |
| 11 | 1549.32 |
| 12 | 1548.51 |
| 13 | 1547.72 |
| 14 | 1546.92 |
| 15 | 1546.12 |
| 16 | 1545.32 |

TABLE 2

| Ch. | Frequency (GHz) | Wavelength (nm) |
|---|---|---|
| 1 | 190,100 | 1577.03 |
| 2 | 190,200 | 1576.20 |
| 3 | 190,300 | 1575.37 |
| 4 | 190,400 | 1574.54 |
| 5 | 190,500 | 1573.71 |
| 6 | 190,600 | 1572.89 |
| 7 | 190,700 | 1572.06 |
| 8 | 190,800 | 1571.24 |
| 9 | 190,900 | 1570.42 |
| 10 | 191,000 | 1569.59 |
| 11 | 191,100 | 1568.77 |
| 12 | 191,200 | 1567.95 |
| 13 | 191,300 | 1567.13 |
| 14 | 191,400 | 1566.31 |
| 15 | 191,500 | 1565.50 |
| 16 | 191,600 | 1564.68 |
| 17 | 191,700 | 1563.86 |
| 18 | 191,800 | 1563.05 |
| 19 | 191,900 | 1562.23 |
| 20 | 192,000 | 1561.42 |
| 21 | 192,100 | 1560.61 |
| 22 | 192,200 | 1559.79 |
| 23 | 192,300 | 1558.98 |
| 24 | 192,400 | 1558.17 |
| 25 | 192,500 | 1557.36 |
| 26 | 192,600 | 1556.55 |
| 27 | 192,700 | 1555.75 |
| 28 | 192,800 | 1554.94 |
| 29 | 192,900 | 1554.13 |
| 30 | 193,000 | 1553.33 |
| 31 | 193,100 | 1552.52 |
| 32 | 193,200 | 1551.72 |
| 33 | 193,300 | 1550.92 |
| 34 | 193,400 | 1550.12 |
| 35 | 193,500 | 1549.32 |
| 36 | 193,600 | 1548.51 |
| 37 | 193,700 | 1547.72 |
| 38 | 193,800 | 1546.92 |
| 39 | 193,900 | 1546.12 |
| 40 | 194,000 | 1545.32 |
| 41 | 194,100 | 1544.53 |
| 42 | 194,200 | 1543.73 |
| 43 | 194,300 | 1542.94 |
| 44 | 194,400 | 1542.14 |
| 45 | 194,500 | 1541.35 |
| 46 | 194,600 | 1540.56 |
| 47 | 194,700 | 1539.77 |
| 48 | 194,800 | 1538.98 |
| 49 | 194,900 | 1538.19 |
| 50 | 195,000 | 1537.40 |
| 51 | 195,100 | 1536.61 |
| 52 | 195,200 | 1535.82 |
| 53 | 195,300 | 1535.04 |
| 54 | 195,400 | 1534.25 |
| 55 | 195,500 | 1533.47 |
| 56 | 195,600 | 1532.68 |
| 57 | 195,700 | 1531.90 |
| 58 | 195,800 | 1531.12 |
| 59 | 195,900 | 1530.33 |
| 60 | 196,000 | 1529.55 |
| 61 | 196,100 | 1528.77 |
| 62 | 196,200 | 1527.99 |
| 63 | 196,300 | 1527.22 |
| 64 | 196,400 | 1526.44 |
| 65 | 196,500 | 1525.66 |
| 66 | 196,600 | 1524.89 |
| 67 | 196,700 | 1524.11 |
| 68 | 196,800 | 1523.34 |
| 69 | 196,900 | 1522.56 |
| 70 | 197,000 | 1521.79 |
| 71 | 197,100 | 1521.02 |
| 72 | 197,200 | 1520.25 |
| 73 | 197,300 | 1519.48 |

The optical communication system 20 may optionally include a second set of one or more optical transmitters 25 which directly output an optical signal having a wavelength which corresponds to an optical channel within the channel plan of the communication system. Consequently, the optical transmitters 25 optically communicate with optical multiplexer or combiner 50 without the need for remodulation by remodulators 30. The optical communication system 20 further optionally includes additional sources of optical signals, e.g., optical signals from optical add/drop multiplexers (OADM), demultiplexers, wavelength selective switches, reconfigurable OADMs, etc. from other optical systems. Examples of various configurations of WDM optical systems with diverse signal sources are described in the parent application, incorporated by reference above.

Figure 3:
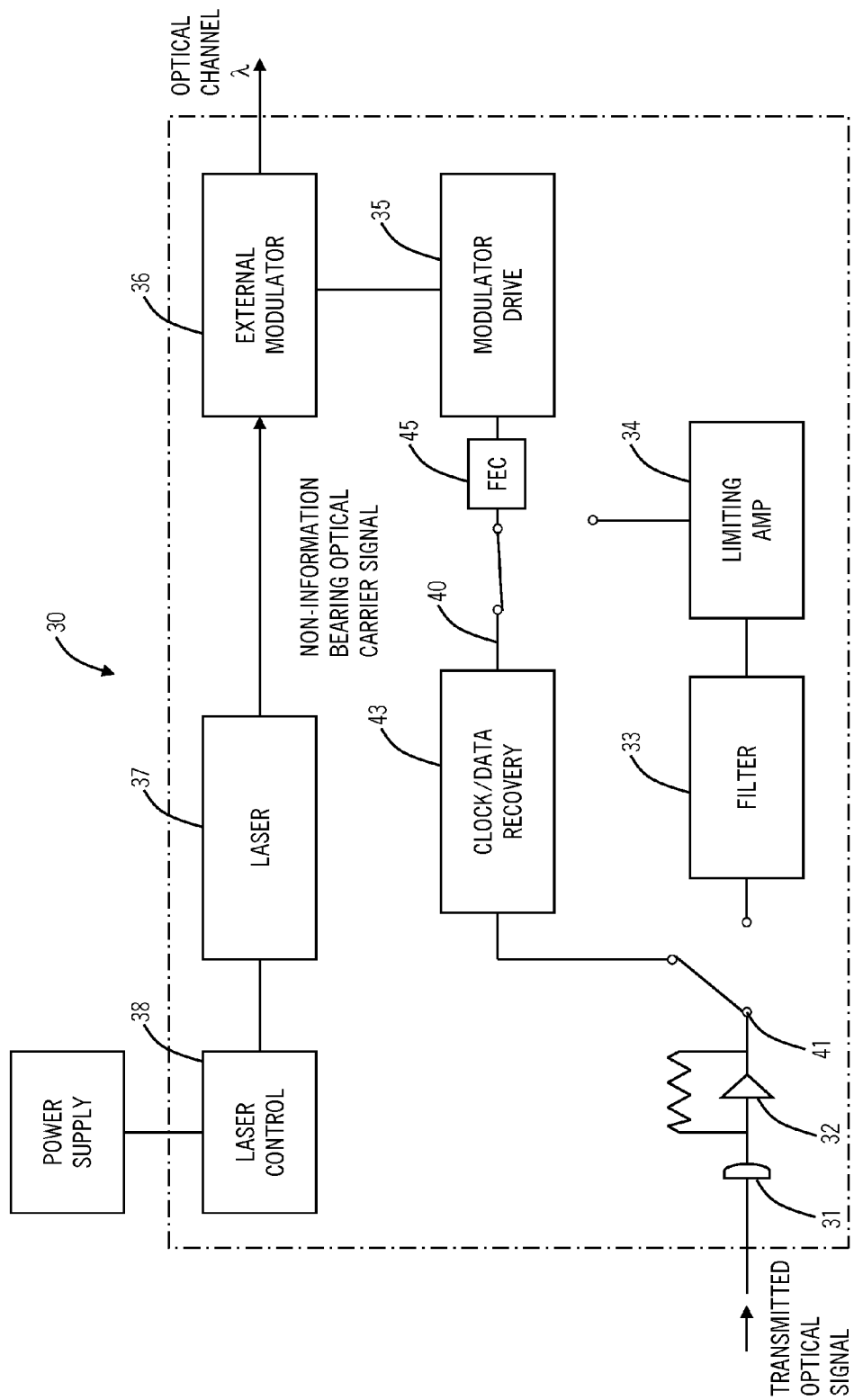
FIG. 3 is a diagram of a remodulator used in the optical communication system of FIG. 2.

Referring to FIG. 3, in an exemplary embodiment, an example of a remodulator 30 for use in the optical communication system 20 is illustrated. In remodulator 30, a transmitted optical signal (i.e., from the client-side) is converted by an electro-optical converter 31, typically a photodiode, to an electrical signal. The electrical signal may be amplified by a transimpedance amplifier 32, passed through a filter 33 to limit the noise bandwidth and waveshape the signal, and further amplified by a limiting amplifier 34. Optionally, the remodulator 30 may include a clock and data recovery circuit 40 for use with high data rate signals. A switch 41 automatically selects high data rate signals and passes them through the clock/data recovery element 43. The selected signals are retimed, advantageously reducing jitter. The retimed signal exits the clock and data recovery circuit through switch 42. The resultant electrical signal is used to drive an external modulator 36 through a modulator driver 35. As used herein, the expression "external modulator" includes any modulator which acts on an optical carrier emitted from an optical source, such as a laser. Such external modulators can be packaged with the optical source or packaged separately from the optical source.

Remodulator 30 also includes an optical source, such as a laser 37, for delivering a non-information-bearing optical carrier signal to a laser output waveguide 39. In an exemplary embodiment, the laser 37 is a distributed feedback (DFB) semiconductor diode laser, generally including one or more III-V semiconductor materials, commercially available from a wide variety of suppliers. The laser 37 outputs an optical carrier signal at a particular channel wavelength, the wavelength corresponding to a channel selector wavelength included in the remodulating channel selector. The laser control 38 provides the required laser bias current as well as thermal control of the laser. Using thermal control, the precise operating wavelength of the laser 37 is maintained throughout the laser's operational life, typically to within a one angstrom bandwidth.

The external modulator 36 acts on the optical carrier signal output from the laser 37, as opposed to acting on the laser 37 itself or on a laser driver, as occurs in direct modulation systems. An exemplary external modulator employs a waveguiding medium whose refractive index changes according to an applied electrical field, i.e., a material exhibiting an electro-optic effect. Consequently, the phase of input optical carrier signals is altered as a result of the changing refractive index of the optical waveguide. A suitable electro-optic waveguiding material for the external modulators of the present invention is lithium niobate, $LiNbO_3$. An exemplary electro-optic modulator for use as external modulator 36 is a Mach-Zehnder interferometric modulator which provides high-speed intensity modulation of optical carriers. In the Mach-Zehnder configuration, two optical paths are provided. An incoming optical carrier is split between the two paths of the interferometer. At least one path of the interferometer is phase modulated. When the signal is recombined at the output, the light from the paths either constructively or destructively interferes, depending upon the electrical field applied to the surrounding electrodes during the travel time of the carrier, creating an amplitude-modulated output signal. Further details of electro-optic modulators are described in Becker, "Broad-Band Guided Wave Electrooptic Modulators," *IEEE Journal of Quantum Electronics*, Vol. QE-20, No. 7, July, 1984, pp. 723-727, the disclosure of which is incorporated by reference herein. Mach-Zehnder interferometers suitable for use in external electro-optic modulator 36 are commercially available from United Technologies, and IOC. The modulated output signal is the information-bearing optical channel whose wavelength corresponds to a particular channel selector wavelength in the optical communication system.

Alternatively, the external modulator employed in the remodulators 30 of the present invention can be selected from electro-absorption external modulators. Electro-absorption modulators function by changing the bandgap of the modulating material to impart information to the optical carrier signal. Exemplary electro-absorption modulators are described in Wood, "Multiple Quantum Well (MQW) Waveguide Modulators," *Journal of Lightwave Technology*, Vol. 6, No. 6, June, 1988, pp. 743-757, the disclosure of which is incorporated by reference herein.

Optionally, the remodulators 30 include forward error correction (FEC) encoders 45. The addition of forward error correction to a WDM optical communication system advantageously decreases the bit error rate (BER) by adding redundancy, e.g., coding bits, to the individual optical channels. In particular, the addition of FEC permits the WDM system to achieve substantially error-free performance in the presence of the accumulated optical noise and nonlinearities present in optical communication system 20. At the receive end, a forward error correction decoder examines the coding bits to accurately reconstruct the transmitted information. A variety of coding algorithms may be used to accomplish forward error correction in the WDM optical systems of the present invention. Exemplary algorithms are convolutional encoding with threshold decoding, Viterbi decoding, or Reed-Solomon encoding/decoding. Detailed descriptions of these and other coding algorithms are found in Wiggert, *Error-Control Coding and Applications*, (Artech House, c. 1978), the disclosure of which is incorporated by reference herein. Advantageously, forward error correction in the WDM optical systems of the present invention enables a "channel trace" function that encodes the channel ID, source, and destination into a small overhead bit stream which would permit the remodulating channel selector to respond only to an incoming signal with the proper addressing. The use of channel tracing through forward error correction additionally permits channel path trace through the WDM system, a particularly useful feature for complex system topologies and WDM systems with extensive add/drop multiplexing or cross-connect features.

Figure 4:
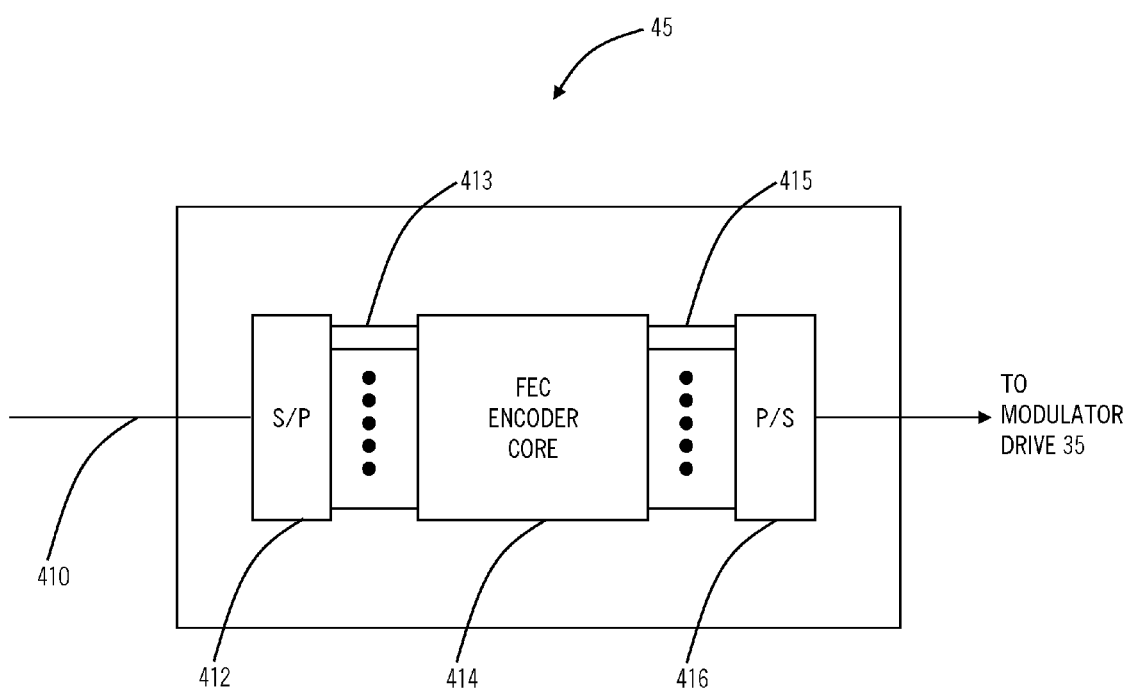
FIG. 4 is a block diagram of a forward error correction encoder.

Referring to FIG. 4, in an exemplary embodiment, a FEC encoder 45 is shown in greater detail. Signals received from the clock/data recovery circuit 43 are supplied to encoder 45 on an input line 410. A serial-to-parallel converter circuit 412, such as a serializer-de-serializer (SERDES), converts the received serial data to parallel data. The output of the serial-to-parallel converter circuit 412 is supplied on a plurality of lines 413 to a FEC encoder core circuit 414. The FEC encoder core circuit 414 may encode the received data in parallel in accordance with a Reed-Solomon code (or some other code) by attaching a plurality of syndrome symbols or groupings of bits followed by an inverse Fourier transform of the data and syndromes. The FEC encoder core circuit 414 outputs encoded data in a parallel to parallel-to-serial converter 416, which serializes the data for output to the modulator drive 35. For example, an exemplary FEC scheme is described in U.S. Pat. No. 6,308,295 issued Oct. 23, 2001, and entitled "Parallel Spectral Reed-Solomon Encoder and Decoder" to Neifeld et al., incorporated by reference herein.

Returning to FIG. 2, each information-bearing optical signal produced by the remodulator 30 includes a channel in the optical system 20, the wavelength of which corresponds to a channel selector wavelength. The optical signal channels output from remodulators 30 are brought together in an optical combiner 50 for conveyance to optical waveguide 60 (e.g., an optical fiber). The optical combiner 50 may include any passive optical component which can combine plural wavelengths into a single output medium. Frequently, optical splitters used to divide a signal among plural outputs are used as optical combiners, operated in reverse fashion from the splitter. Exemplary optical combiners include 1×N passive splitters available from Corning, Inc., Corning, N.Y., 1×N wideband single mode splitters available from IOT Integrierte Optik GmbH, Waghausel-Kirrlach, Germany, and fused fiber combiners available from Gould, Inc., Millersville, Md. The combination of channels forms a multiplexed optical signal which is output to the waveguide 60. The optical waveguide 60 is typically a single-mode optical fiber such as non-dispersion shifted fiber (NDSF), non-zero dispersion shifted fiber (NZDSF), dispersion shifted fiber (DSF), and the like, and is the principal transmission medium for the optical communication system. However, any optical waveguide which is capable of transporting multiple optical wavelengths may be employed as the waveguide 60 in the optical system 20.

Interposed along the optical waveguide 60 may be one or more optical amplifiers 70. The optical amplifiers 70 may include any device which directly increases the strength of plural optical signals without the need for optical-to-electrical conversion. In general, the optical amplifiers 70 may include optical waveguides doped with rare earth ions such as erbium, neodymium, praseodymium, ytterbium, or mixtures thereof. The optical amplifiers 70, their materials, and their operation are further described in Gowar, Ed. *Optical Communication Systems*, incorporated by reference above and in Desurvire, *Erbium-Doped Fiber Amplifiers*, (John Wiley & Sons, Inc., N.Y.), c. 1994, the disclosures of which are incorporated by reference herein. Exemplary optical amplifier configurations are described in the parent applications, the disclosures of which are incorporated by reference. Further descriptions of doped-fiber optical amplifier configurations suitable for use in the optical communication system of the present invention are described in Bjarklev, *Optical Fiber Amplifiers: Design and System Applications*, (Artech House, Norwood, Mass.) c. 1993, the disclosure of which is incorporated herein by reference.

Following transmission and amplification of the multiplexed optical signals along the waveguide 60, a portion of the multiplexed optical signal must be sent to each of a plurality of remodulating channel selectors 100 for selection and routing to an appropriate optical receiver. The multiplexed signal is input to an optical splitter 90 which places a portion of the multiplexed signal onto plural output paths 92. Each output path 92 optically communicates with a remodulation channel selector 100. An optical splitter 90 is selected from any optical device which can divide an input optical signal and place it onto plural output paths. Exemplary splitters include passive optical components such as those components described for use as the optical combiner 50. A splitter 90 in combination with the remodulating channel selectors 100 is an exemplary wavelength demultiplexer.

Figure 5:
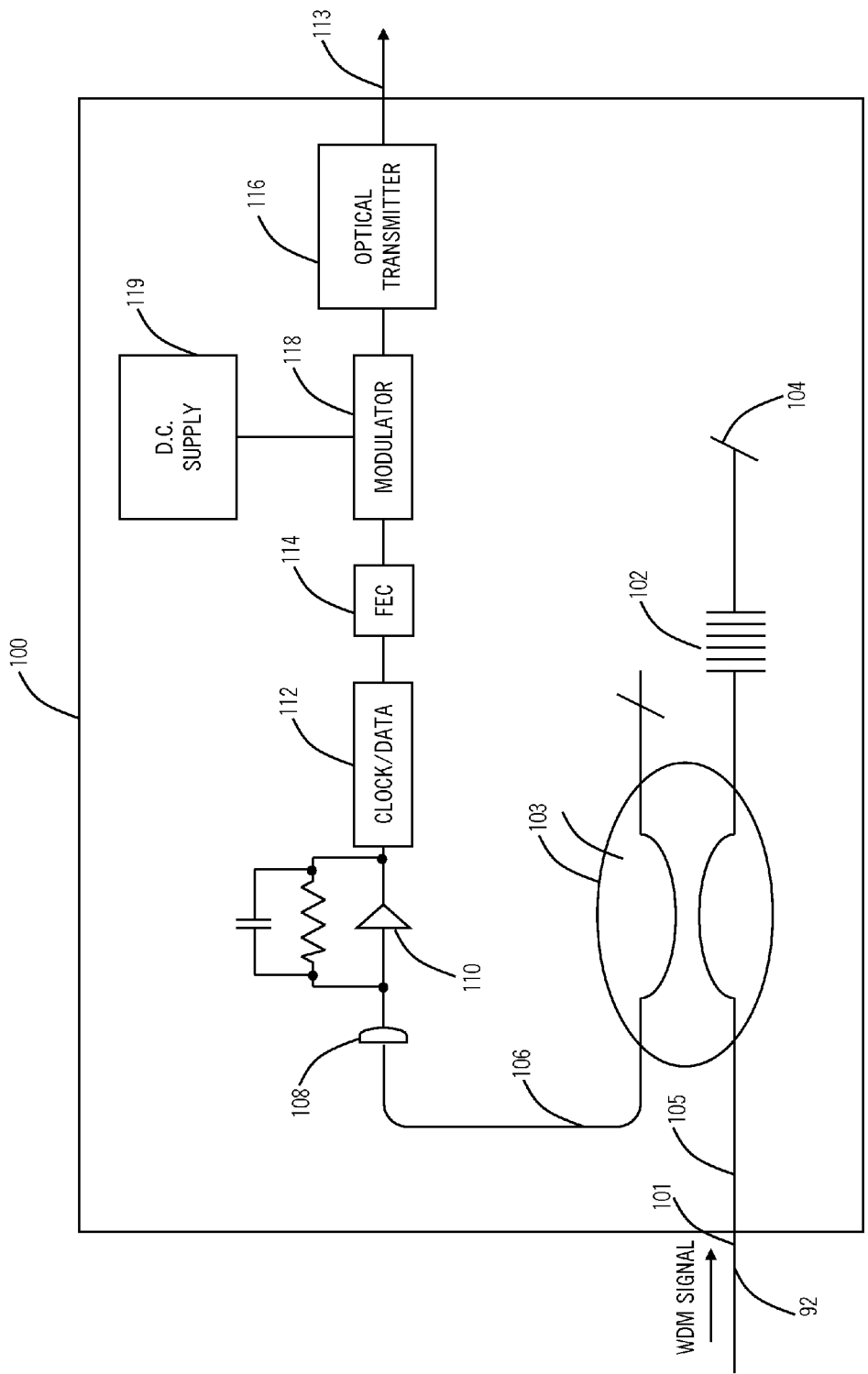
FIG. 5 is a diagram of a remodulating channel selector used in the optical communication system of FIG. 2.

Referring to FIG. 5, in an exemplary embodiment, an exemplary remodulating channel selector 100 is illustrated for use in the optical communication system 20. The remodulating channel selector 100 includes an optical input port 101 for receiving the WDM optical signal from a splitter output path 92. The WDM optical signal traverses optical path 105 through a splitter 103 to a channel selector 102. The channel selector 102 passes optical signals having wavelengths other than the channel wavelength to be processed by the remodulating channel selector 100. These non-selected channels pass through a low reflectivity port 104 and exit the optical communication system. The low reflectivity port 104 may be an angled fiber cut, although any low reflectivity waveguide termination technique may be employed. The selected channel wavelength is reflected by the channel selector 102 through the splitter 103 onto an optical path 106. In an exemplary embodiment, the optical splitter 103 is a fused fiber coupler and the channel selector 102 includes a Bragg grating member configured to reflect the selected channel wavelength. Preferably, the Bragg grating comprises a series of photoinduced refractive index perturbations in an optical fiber which causes the reflection of optical signals within a selected wavelength band. Bragg gratings suitable for use in the optical system of the present invention are described in Morey et al., "Photoinduced Bragg Gratings in Optical Fibers," *Optics and Photonics News*, February 1994, pp. 8-14, the disclosure of which is incorporated by reference herein.

Although a Bragg grating is depicted as the channel selecting element, it is understood that numerous other optical components can be employed as the channel selector 102. Such optical components include, but are not limited to, multilayer interference filters, tunable Fabry-Perot selectors, and wavelength routers. In an exemplary embodiment, the optical bandwidth is selected to be sufficiently narrow to minimize the deleterious effects of amplified spontaneous emission (ASE). The selected optical channel is converted by an electro-optical converter 108, typically a photodiode, to an electrical signal. The electrical signal is amplified by a transimpedance amplifier 110 and routed through a clock and data recovery circuit 112 for retiming. In an exemplary embodiment, the electrical bandwidth of the optical-to-electrical converter and the transimpedance amplifier is selected to match the data rate of the incoming signal. Optionally, the remodulating channel selector 100 includes a FEC decoder 114 circuit for accurate reconstruction of the transmitted signal, as discussed above.

Figure 6:
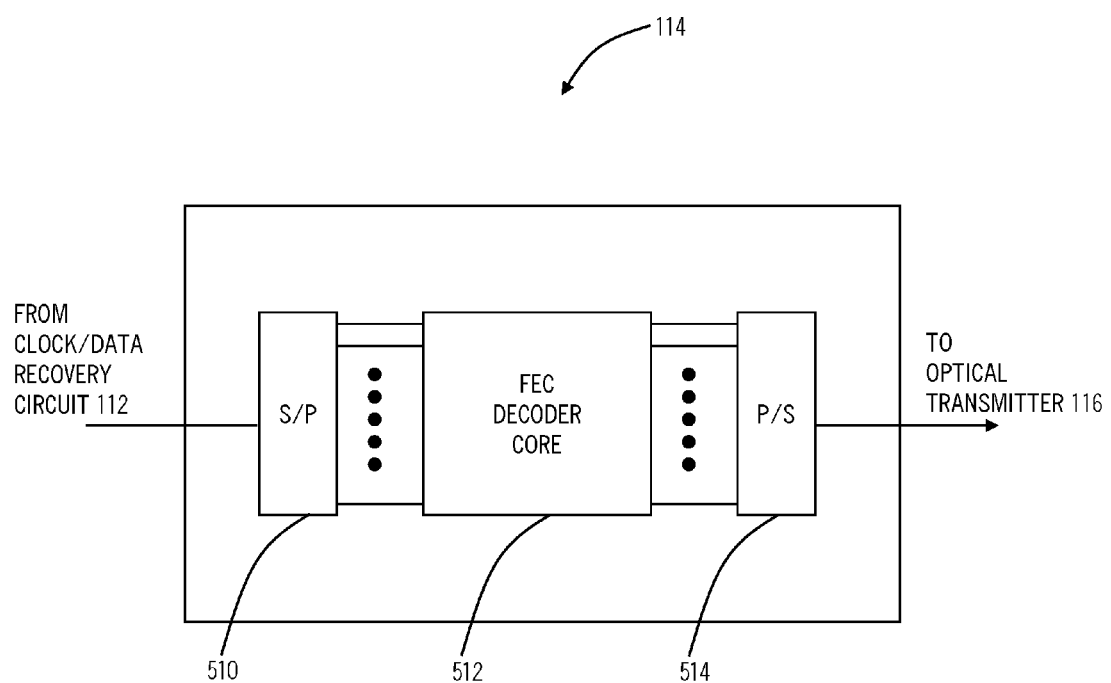
FIG. 6 is a block diagram of a forward error correction decoder.

Referring to FIG. 6, in an exemplary embodiment, an exemplary FEC decoder 114 includes a serial-to-parallel converter 510, a FEC decoder core circuit 512, and a parallel-to-serial converter circuit 514. Data from the clock/data recovery circuit 112 is supplied to the serial-to-parallel converter 510, which supplies a parallel output to the FEC decoder core circuit 512, as described, for example, in Neifeld et al., supra. As further described in Neifeld et al., the FEC decoder core circuit 512 includes a Fourier transform circuit, Berlekamp algorithm circuit and Recursive Extension circuit (not shown). Received data is decoded by initially performing the Fourier transform. The data is next typically supplied to both a temporary memory and the Berlekamp algorithm circuit, which acts on the data in parallel to supply a parallel output to the Recursive Extension circuit. The recursive extension circuit, also operates in parallel, to generate an error signal, which is compared with the received data stored in memory. As a result, errors which may have occurred during transmission, for example, are corrected. The resulting parallel output of the FEC decoder core circuit 512 is supplied to the parallel-to-serial conversion circuit 514 and passed to the modulator 118. The parallel construction of the FEC decoder 114, as well as the FEC encoder 45 described above, permits encoding and decoding of data at high speeds.

Returning to FIG. 5, direct modulation of an optical transmitter 116 by way of a modulator 118 will now be described. Although "modulator" 118 is depicted as a discrete device, in actuality it may include a DC power supply 119 interconnected with an electronic switch. The electronic switch in turn optically communicates with the electrical signal containing the information from the selected channel output through the optical-to-electrical converter and processed by the subsequent elements. The electronic switch controls the flow of current from the DC supply to the optical emitter in response to the information received from the electrical signal. Alternatively, the direct modulation of the emitter can be performed using a voltage-controlled current source for the elements labeled 118 and 119 in FIG. 5. Such a current source for the optical emitter provides a current whose magnitude is directly related to the applied voltage. The applied voltage represents the information received from the optical-to electrical converter; alternatively the current may be directly derived from the modulating voltage.

The optical transmitter 116 may be selected from a variety of optical devices, depending upon the optical interface required for a receiver 130 (on the client-side). When the signal emitted by the remodulating channel selector 100 is destined for long distance transmission (e.g., through the optical combiner of a further WDM optical system as depicted in FIG. 1), the optical emitter may be a DFB laser. When the signal emitted by the remodulating channel selector 100 is destined for an adjacent receiver, the optical emitter within the optical transmitter 116 is may be lower-cost, shorter-range optical emitters such as Fabry-Perot lasers, light-emitting diodes, and superluminescent diodes.

The wavelength of the optical emitter employed in the optical transmitter 116 can be the same wavelength as the wavelength of the optical channel selected by the particular channel selector or it can be a different wavelength. When the optical channel is output directly to a receiver, the wavelength of the optical signal is not critical. In such an embodiment, the same wavelength can be output by all of the optical transmitters 116. Since an optical signal being output directly to an optical receiver need not be optically amplified, the optical emitter can be selected to have any wavelength detectable by the optical receiver (e.g., a wavelength outside the gain band of rare-earth doped fiber amplifiers such as 1310 nm). However, if the optical signal emitted by the remodulating channel selector 100 is destined for transmission in the same or another WDM system, then the wavelength of the optical emitter is selected to be compatible with the channel plan of that system. For example, the optical emitter may create a signal having the same wavelength as the selected optical signal, or it may produce an optical signal having a wavelength which corresponds to another channel from the input WDM optical signal. If the remodulating channel selectors 100 are incorporated into a switching matrix, a variable wavelength optical emitter can be used to dynamically select an available wavelength within a WDM optical channel plan. In an alternate embodiment (not shown) the optical signal emitter is externally modulated, e.g., as in the remodulators 30 of FIG. 3. External modulation is particularly advantageous when the signal output by the remodulating channel selector is destined for long-distance transmission. In such an embodiment, the remodulating channel selectors 100 can serve to reshape and retime an optical signal, e.g., an optical signal which has traversed the maximum dispersion-limited transmission distance (e.g., a distance of approximately 600 km for optical fibers such as SMF-28).

In this manner, a modulated optical signal is output by the optical transmitter 116 through a remodulating channel selector output port 113. The remodulating channel selector output signal is transmitted to the optical receiver 130. The receiver 130 generally detects the optical signal and converts it to an electrical signal, typically through the use of a photodiode device. Various optical receivers suitable for use in the optical system 20 are described in Gowar, *Optical Communication Systems*, discussed above. In the optical communication system 20, the receiver 130 will frequently be part of an existing optical communication system to which the remodulated optical signal is routed. Consequently, the optical system 20 can function with numerous types of receivers to ensure compatibility with existing optical equipment. In particular, the presence of remodulating channel selectors 100 enables the WDM optical communication system to communicate with optical receivers conforming to the SONET "short-haul" standard. Further descriptions of SONET interface standards are found in *SONET Transport Systems Common Criteria*, (GR-253-CORE, Issue 1, December, 1994), the disclosure of which is incorporated by reference herein.

Alternatively, as depicted in FIG. 2, the output of a remodulating channel selector 100 is conveyed to another WDM optical system or a portion of the same WDM optical system through input to an optical combiner for multiplexing with other optical signals or routing, e.g., through an add/drop multiplexer. Optionally, channel selectors 120 are provided for selecting an optical channel from an input WDM optical signal. Such channel selectors 120, described in more detail in the parent applications incorporated by reference above, select an optical channel and directly output the selected channel without remodulation. Such channel selectors 120 are used particularly when the optical receivers with which they communicate conform to the SONET "long-haul" standard. Such "non-remodulating" channel selectors can also route their selected optical channels to an optical combiner for further transmission in the same WDM optical system or in a different WDM optical system.

Figure 7:
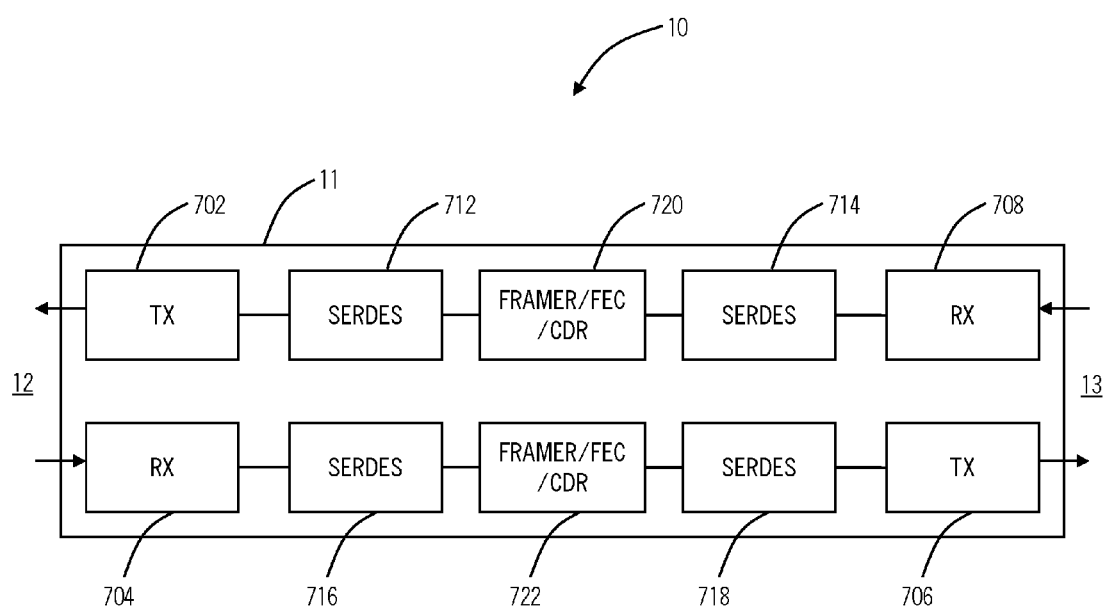
FIG. 7 is a block diagram of various components associated with the optical transponder of FIG. 1.

Referring to FIG. 7, in an exemplary embodiment, a block diagram illustrates various components associated with the optical transponder 10. As described herein, the optical transponder 10 includes the device 11, the client-side 12, and the line-side 13. The device 11 may include any of, but not limited to, a circuit pack, line module, blade, printed circuit board, integrated circuit, and the like. Specifically, the device 11 is a physical housing for the optics and electronics associated with the transponder 10 or a circuit in which the optics and electronics are formed therein. Further, as described herein, the transponder 10 provides a bi-directional interface between the client-side 12 and the line-side 13. The client-side 12 includes a client-side optical transmitter (TX) 702 and a client-side optical receiver (RX) 704. The line-side 13 includes a line-side optical transmitter (TX) 706 and a line-side optical receiver (RX) 708.

The TX 702 and the RX 704 are communicatively coupled to a client-side device as described herein. Collectively, the TX 702 and the RX 704 form a transceiver (TR) that provides bi-directional optical communication with the client-side device. The TR may include discrete or integrated components. Further, the TR may include a pluggable device such as a daughterboard or the like. In an exemplary embodiment, the RX 704 may include a wide-band optical receiver capable of receiving an optical signal at a plurality of different wavelengths such as 1250 nm to 1600 nm and to convert the received optical signal into a serial electrical signal. The TX 702 may include any type of optical transmitter including a short-reach, 1310 nm transmitter, a 1550 nm longer reach transmitter, a WDM transmitter, and the like. The TX 702 also includes a modulator to modulate a data signal onto a laser and optionally a wavelength locker to maintain a precise operating wavelength of the laser.

The TX 706 and the RX 708 are communicatively coupled to a line-side device as described herein. Collectively, the TX 706 and the RX 708 form a transceiver (TR) that provides bi-directional optical communication with the line-side device. For example, the line-side device may include some type of optical combiner/splitter that combines/splits a WDM signal from the TX 706 and the RX 708 with other WDM signals at other wavelengths in a WDM wavelength channel plan. In an exemplary embodiment, the RX 708 may include a wide-band optical receiver capable of receiving an optical signal at a plurality of different wavelengths such as 1250 nm to 1600 nm and to convert the received optical signal into a serial electrical signal. In another exemplary embodiment, the RX 708 may include a quadrature modulation receiver (or multiple receivers for polarization multiplexed systems) that utilizes DPSK, DQPSK, etc. The TX 706 may include a WDM transmitter capable of transmitting a WDM wavelength based on an associated WDM wavelength channel plan (or tuning to a plurality of wavelengths within the channel plan). In an exemplary embodiment, the TX 706 may include an NRZ or RZ OOK transmitter. In another exemplary embodiment, the TX 706 may include a quadrature modulation transmitter (or multiple transmitters for polarization multiplexed systems) that utilizes DPSK, DQPSK, etc.

The optical transponder 10 further includes electrical circuitry forming SERDES 712, 714, 716, 718 and framer/FEC/Clock and Data Recovery (CDR) 720, 722. These various electrical circuits are configured to prepare a data signal for remodulation, process overhead data, provide protocol encapsulation and framing, process forward error correction, provide 2R/3R functionality, and the like. The SERDES 712, 714, 716, 718 are parallel-to-serial conversion circuits. Specifically, for high-speed systems (10 Gb/s, 40 Gb/s, 100 Gb/s, etc.) it is difficult to electrically process a data signal serially. As such, the SERDES 712, 714, 716, 718 convert a serial signal into a parallel signal for electrical processing. The framer/FEC/Clock and Data Recovery (CDR) 720, 722 may be configured to perform various electrical functions on the parallel signal including framing with OTN, SONET/SDH, etc., processing of overhead data such as in an OTN or SONET/SDH frame, encoding of the parallel signal for quadrature modulation, processing of forward error correction, and the like.

In particular, the RX 704 is configured to receive a signal from the client-side 12, convert the signal from optical to electrical, and provide the electrical signal to the SERDES 716. The SERDES 716 converts the electrical signal into a plurality of lower speed signals and provides these lower speed signals to the framer/FEC/Clock and Data Recovery 722 for processing. Once processed, the framer/FEC/Clock and Data Recovery 722 provides the processed lower speed signals to the SERDES 718 which converts the lower speed signals into one or more higher speed signals for the TX 706 to modulate an optical signal for transmission to the line-side 13. Similarly, the RX 708 provides similar functions from the line-side 13 to the client-side 12.

Figure 8:
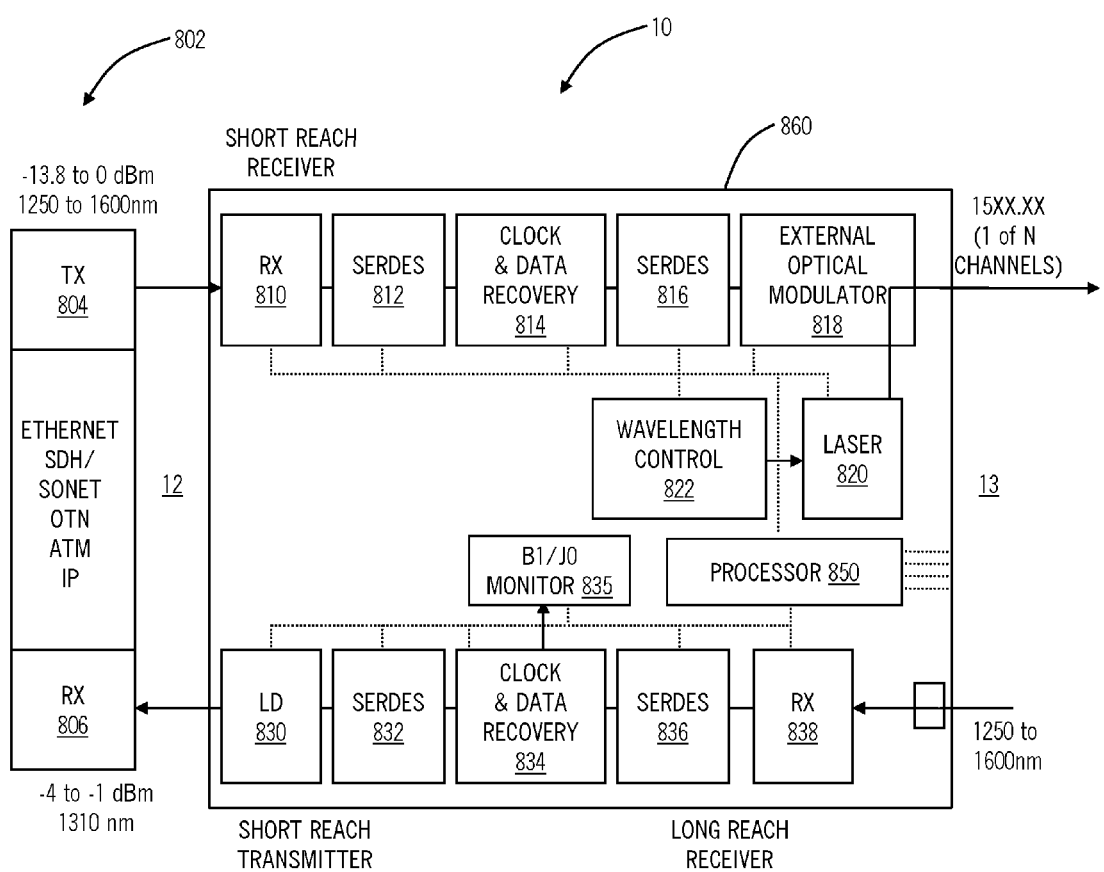
FIG. 8 is a block diagram of an exemplary transponder connected to a client-side device.

Referring to FIG. 8, in an exemplary embodiment, an example transponder 10 is illustrated connected to a client-side device 802. The client-side device 802 may include an Ethernet, SDH/SONET, OTN, ATM, IP, Fibre Channel, etc. network element. The client-side device 802 may include a transmitter 804 transmitting a client-side signal to the transponder 10 at any wavelength between 1250 to 1600 nm and a receiver 806 receiving the client-side signal from the transponder 10 at a short reach 1310 nm wavelength. The client-side signal may be any type of high-rate signal such as a 10 Gb/s, 40 Gb/s, 100 Gb/s, etc. signal. In this exemplary embodiment, the transponder 10 utilizes SONET, but those of ordinary skill in the art will recognize the transponder 10 may also use SDH, OTN, or the like.

The client-side transmitter 804 connects to a short-reach receiver 810 on the transponder 10 that is configured to provide optical-to-electrical conversion of the client-side signal and provide the converted signal to a SERDES 812 that converts the signal to a plurality of lower speed signals for processing by the CDR 814. In general, the CDR 814 is configured to provide 3R transponder functionality as described herein including overhead processing. From there, a SERDES 816 serializes the signal and provides the signal to an external optical modulator 818. The external optical modulator 818 receives a laser signal from a laser 820 and modulates the laser signal with the signal from the SERDES 816. The laser 820 provides a constant laser output at a particular WDM wavelength (e.g., 15XX.XX, 1 of N channels). Optionally, the laser 820 is configured to tune over a band of WDM wavelengths. Further, the transponder 10 includes a wavelength control device 822 that monitors and corrects changes in the WDM wavelength of the laser 820. The wavelength control device 822 is generally referred to as a wavelength locker. The external optical modulator 818 may provide any type of modulation on the laser signal including, but not limited to, NRZ-OOK, RZ-OOK, RZ-DPSK, RZ-DQPSK, Polarization multiplexing, and the like.

The client-side receiver 806 connects to a short-reach transmitter 830 (e.g., a laser diode (LD)) on the transponder 10 that is configured to provide a line-side signal to the client-side device 802. The transmitter 830 receives the line-side signal from a SERDES 832 that converts the line-side signal from a plurality of lower speed signals. The SERDES 832 receives the plurality of lower speed signals from a CDR 834 which processing the lower speed signals such as providing 3R transponder functionality as described herein including overhead processing. For example, the CDR 834 may provide B1/J0 byte monitoring in SONET overhead through a monitor circuit 835 (that may also be part of the CDR 834). The CDR 834 receives the lower speed signals from a SERDES 836 which provides the lower speed signals from the line-side signal received from a receiver 838.

The transponder 10 may include a processor 850 which is communicatively coupled to the various components, electronics, and optics in the transponder 10. The processor 850 may include hardware, software, and/or firmware for operating the transponder 10 and monitoring and reporting events, statistics, and other data associated with the transponder to an external management device, module, etc. The transponder 10 may be physically realized in a device 860. The device 860 may be a line module with a circuit board including one or more transponders 10. Also, the device 860 may be an integrated circuit with one or more transponders 10.

Figure 9:
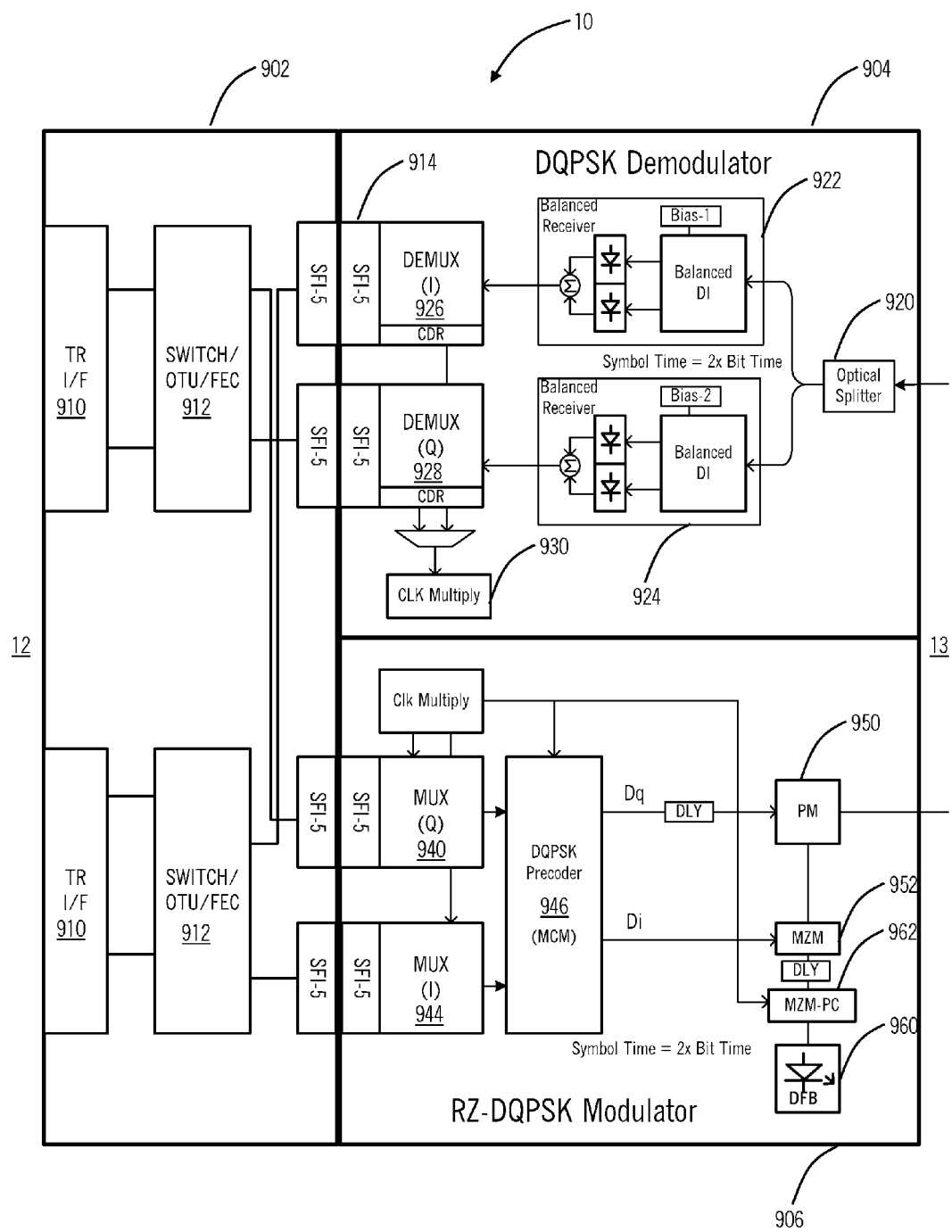
FIG. 9 is a block diagram of an exemplary transponder supporting Return-to-Zero Differential Quadrature Phase Shift Keying (RZ-DQPSK) for high-speed applications.

Referring to FIG. 9, in an exemplary embodiment, a transponder 10 is illustrated supporting RZ-DQPSK for high-speed applications. For example, the high-speed applications may include 100 Gb/s Infiniband and/or Ethernet as described in parent application Ser. No. 12/166,537, "High-Speed Optical Transceiver for Infiniband and Ethernet). The transponder 10 of FIG. 9 includes three sections, a client interface 902, a DQPSK demodulator 904, and a DQPSK modulator 906. The client interface 902 includes optics and electronics to interface to the client-side 12. For example, the client interface 902 may include one or more transceivers (TR) 910 that provide one or more clients signals. The transceivers 910 may be serial or parallel. For example, the transceivers 910 may include a plurality of pluggable modules (e.g., XFPs), 12×DDR (Double Data Rate) interfaces, and the like. The transceivers 910 provide an electrical signal to a switch/OTU/FEC circuit 912 that is generally configured to provide SERDES functionality, possibly payload mapping such as into Generic Framing Protocol (GFP), mapping into an OTN frame, forward error correcting, and the like. The switch/OTU/FEC circuit 912 may interface with the DQPSK demodulator 904 and the DQPSK modulator 906 via SERDES Framer Interface Level 5 (SFI-5) interfaces 914. SFI-5 is described in "Serdes Framer Interface Level 5 (SFI-5): Implementation Agreement for 40 Gb/s Interface for Physical Layer Devices" dated Jan. 29, 2002 from the Optical Internetworking Forum, the contents of which are incorporated by reference herein.

The DQPSK demodulator 904 receives a line-side signal from the line-side 13 and demodulates the line-side signal for the client interface 902. The DQPSK demodulator 904 includes an optical splitter 920 that is configured to receive the line-side signal and split it to two separate balanced receivers 922, 924. The balanced receiver 922 provides demodulation of an in-phase signal (I) and the balanced receiver 924 provides demodulation of a quadrature signal (Q). The balanced receivers 922, 924 include a balanced detector and interferometer that connects to a bias and provides a copy of the input to provide differential detection with two photo-detectors and a summer. The balanced receivers 922, 924 provide an electrical output to demultiplexers 926, 928 that demultiplex the signal, provide clock and data recovery and provides a clock to a clock multiplier 930 (which is used in the DQPSK modulator 906). The demultiplexers 926, 928 may connect to the client interface 902 via the SFI-5 interfaces 914.

The DQPSK modulator 906 is configured to provide the line-side signal from the client interface 902. In particular, the DQPSK modulator 906 receives the client-side signal from the SFI-5 interfaces 914 which interface to multiplexers 940, 942 (one for the I and the Q signal). The multiplexers 940, 944 provide outputs to a DQPSK precoder 946 for multicarrier modulation (MCM) which precodes the Data (Dq and Di) for modulation. In this exemplary embodiment, the DQPSK modulator 906 includes a delay on the Dq line which connects to a phase modulator (PM) 950. The Di line connects to a Mach Zehnder modulator (MZM) 952 which connects to the PM 950 also through a delay. A laser 960 connects to the MZM 952 through an MZM pulse carver 962. Collectively, the clock multiplier 930 is provided to various components in the DQPSK modulator 906.

Figure 10:
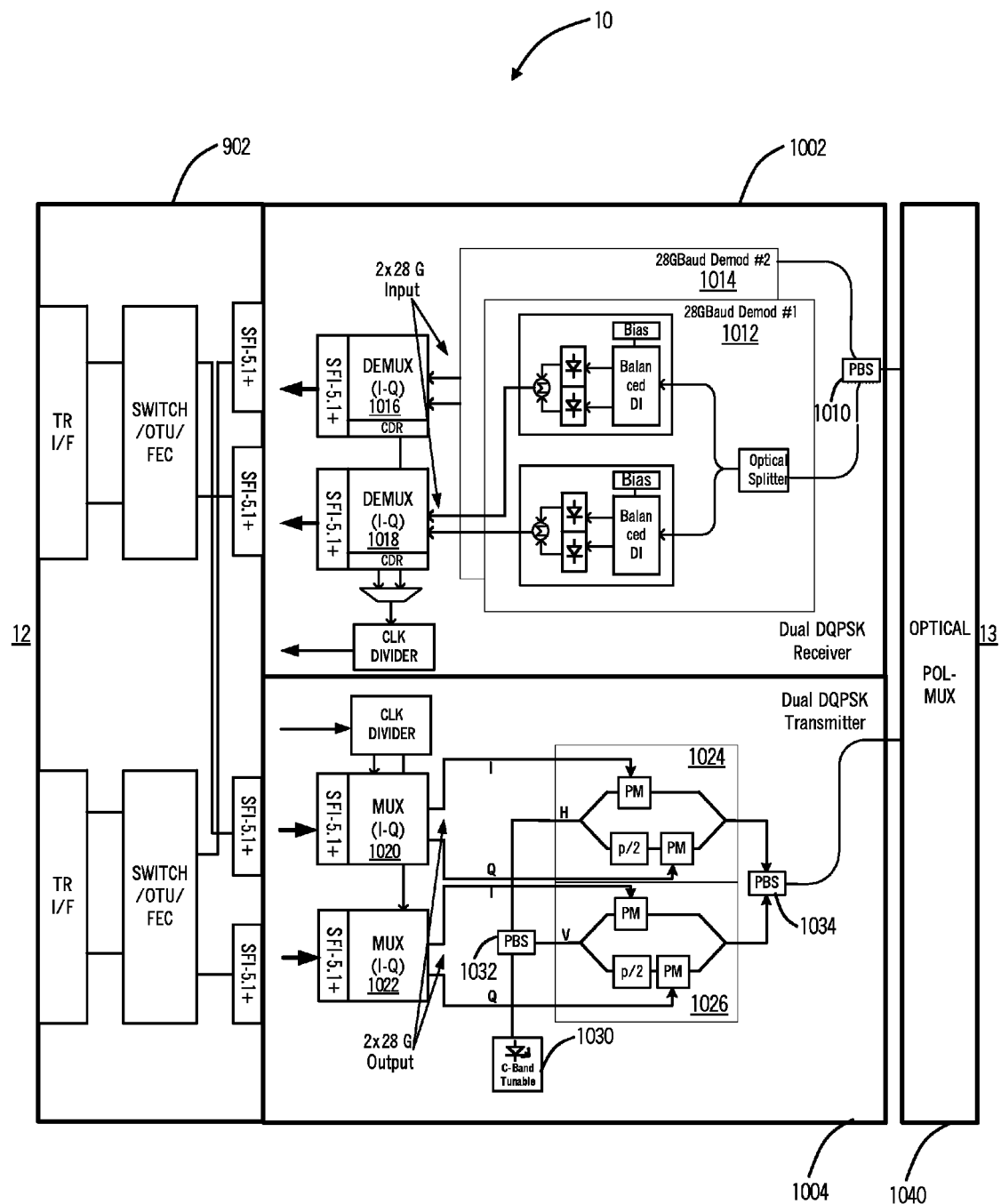
FIG. 10 is a block diagram of an exemplary transponder supporting polarization multiplexed DQPSK for high-speed applications.

Referring to FIG. 10, in an exemplary embodiment, a transponder 10 is illustrated supporting polarization multiplexed DQPSK for high-speed applications. Similar to the transponder 10 of FIG. 9, the transponder 10 of FIG. 10 includes a client interface 902, a pol-mux DQPSK demodulator 1002, and a pol-mux DQPSK modulator 1004. The client interface 902 is substantially the same as described in FIG. 9, but may include an SFI-5.1+ interface. In this exemplary embodiment, the transponder 10 may be configured to support 112 Gb/s through a 28 Gb/s signal that utilizes DQPSK providing 56 Gb/s throughput and utilizing horizontal (H) and vertical (V) polarizations providing 112 Gb/s throughput. For example, the transponder 10 may support 100 Gb/s client data through an OTN wrapper.

The pol-mux DQPSK demodulator 1002 is similar to the DQPSK demodulator 904 but includes a polarization beam splitter (PBS) 1010 which splits the horizontal and vertical polarizations to separate demodulators 1012, 1014. Each of the demodulators 1012, 1014 includes similar components as the demodulator 904, but performs demodulation for both I and Q signals for its respective polarization. Outputs of the demodulators 1012, 1014 connect to demultiplexers 1016, 1018 which provide a clock and electrical signal outputs (such as via the SFI-5.1+ interface) to the client interface 902.

The pol-mux DQPSK modulator 1004 receives the client-side signal from the client interface 902 such as via the SFI-5.1+ interface at multiplexers 1020, 1022. The multiplexers 1020, 1022 format the I and Q data for modulation on each of the horizontal and vertical polarizations. The pol-mux DQPSK modulator 1004 includes two modulators 1024, 1026 each modulating one of the horizontal and vertical polarizations. The modulator 1024 receives I and Q data from the multiplexer 1020 and the modulator 1026 receives I and Q data from the multiplexer 1022. A tunable laser 1030 provides a laser signal to the modulators 1024, 1026 through a PBS 1032. The modulators 1024, 1026 include phase modulators connected to the I and Q data and a delay. Outputs of the modulators 1024, 1026 are combined via a PBS 1034 and then provided to an optical polarization multiplexer 1040.

Figure 11:
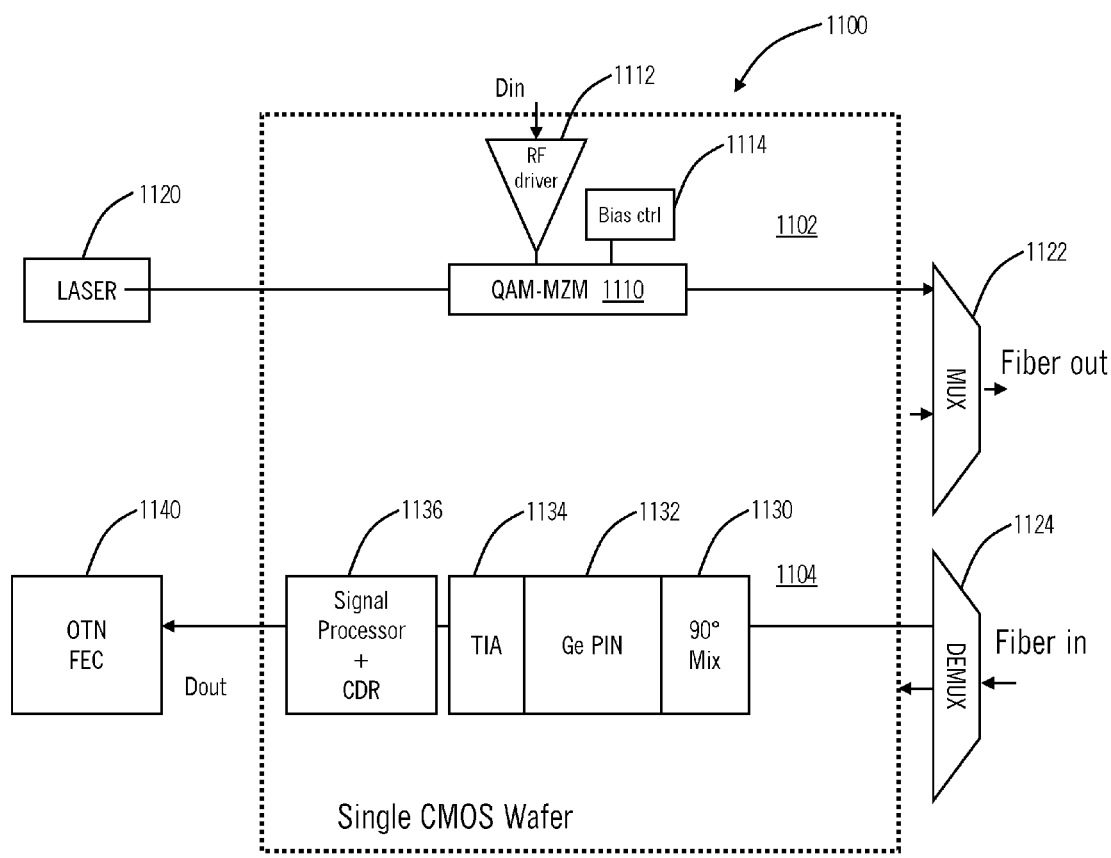
FIG. 11 is a diagram of an integrated circuit depicting integration of some components of the transponder in a single wafer.

Referring to FIG. 11, in an exemplary embodiment, an integrated circuit 1100 is illustrated depicting integration of some components of the transponder 10. Specifically, the integrated circuit 1100 may include a Complementary metal-oxide-semiconductor (CMOS) wafer. Advantageously, using CMOS, the integrated circuit 1100 may leverage existing CMOS fabrication plants, infrastructure, technology, etc. CMOS (i.e., silicon) provides various performance improvements in optical components as well as reducing cost, reducing footprint, etc. For example, CMOS has ultra-high optical index contrast providing very low bending loss and compact devices, CMOS has high performance actives and uses very low power for high optical and electrical confinement and small active device volumes, etc. CMOS provides a good solution for reducing packaging size and cost. CMOS may integrate optical modulation, drivers, receivers, radio frequency (RF) amps, digital circuitry for electrical signal processing, etc. with minimal electrical parasitics, loss, and power. CMOS in the same package may also integrate optical filters, arrayed waveguide gratings (AWGs), optical couplers, splitters, etc. Also, CMOS may include optical or electrical switching components such as required in a ROADM. For PIN photodetectors, the CMOS wafer may include Germanium (Ge) spots, and the only thing external may be the laser. In additional to the foregoing, CMOS also has large available wafer real estate and near perfect yield. Further, silicon has ~2× better (~149 W/m/K) thermal conductivity relative to InP (68)—easier component cooling.

The exemplary integrated circuit 1100 includes both a modulator 1102 and a demodulator 1104 section on the same CMOS wafer. The modulator 1102 includes a QAM Mach-Zehnder modulator (MZM) 1110 in the wafer connected to an RF driver 1112 that receives a data input (Din) for modulating the MZM 1110 and a bias control 1114 circuit for controlling the MZM 1110. As discussed above, a laser 1120 is external to the circuit 1100 but can connect to the MZM 1110. In FIG. 11, an output of the MZM 1110 is shown connecting to an external multiplexer 1122, however the multiplexer 1122 may also be realized in the integrated circuit 1100. The demodulator 1104 receives a line-side signal from a demultiplexer 1124 into a 90-Degree Optical Hybrid mixer 1130 in the circuit 1100. A Ge PIN 1132 detects the outputs of the 90-Degree Optical Hybrid mixer 1130 and the output is amplified by a transimpedance amplifier (TIA) 1134. A Signal Processor+ CDR 1136 receives the output of the TIA 1134 and may provide electrical signal processing such as dispersion equalization, polarization mode dispersion compensation, and mitigation of other non-linear effects. The output signal may be provides to an OTN/FEC circuit 1140 that is illustrated outside of the circuit 1100 but may also be integrated within the circuit 1100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:
1. An optical system, comprising:
   an optical remodulator comprising a client-side, $\lambda_{Ti}$, and a line-side, $\lambda_j$, with electrical signal processing between the client-side and the line-side, wherein $\lambda_{Ti}$ is different from $\lambda_j$, with each having a same information-bearing signal thereon, wherein the line-side is part of a wavelength division multiplexing system and wherein the client-side utilizes a wavelength of about 1300 to 1600 nm, wherein the client-side operates a first protocol and the line-side operates a second protocol, wherein the first protocol is any of SONET, SDH, OTN, ATM, Ethernet, and Fibre Channel, and wherein the second protocol is any of SONET, SDH, OTN, and Ethernet, and wherein the client-side comprises a network element operating at any of layer one, layer two, and/or layer three, and wherein the line-side forms a wave division multiplexing layer separate from the layer one, layer two, and/or layer three.

2. The optical system of claim 1, wherein the client-side comprises a first transmitter and a first receiver; and wherein the line-side comprises a second transmitter and a second receiver.

3. The optical system of claim 2, further comprising:
circuitry communicatively coupling the client-side and the line-side;
wherein the circuitry is configured to re-shape, re-time, and/or re-amplify a signal there between.

4. The optical system of claim 2, further comprising:
circuitry communicatively coupling the client-side and the line-side;
wherein the circuitry is configured to perform one or more of:
remodulating a signal between the client-side and the line-side;
processing overhead data on the signal; and
performing forward error correction on the signal.

5. The optical system of claim 3, wherein the second transmitter comprises an external modulator, a laser, and a wavelength control device configured to maintain wavelength accuracy of the laser.

6. The optical system of claim 3, wherein the second transmitter and the second receiver utilize quadrature amplitude modulation.

7. The optical system of claim 3, wherein the second transmitter and the second receiver utilize quadrature amplitude modulation and polarization multiplexing.

8. The optical system of claim 3, wherein the circuitry is formed as a single integrated circuit, and wherein the single integrated circuit further comprises one or more of the first transmitter, the first receiver, the second transmitter, and the second receiver.

9. The optical system of claim 8, wherein the single integrated circuit comprises CMOS and a laser associated with the first transmitter and a laser associated with the second transmitter are each external to the CMOS.

10. The optical system of claim 9, wherein the single integrated circuit further comprises one or more additional optical remodulator.

11. The optical system of claim 3, wherein the circuitry is further configured to frame an information-bearing signal between the client-side and the line-side with an OTN frame.

12. The optical system of claim 11, wherein the circuitry is further configured to process forward error correction in the OTN frame.

13. The optical system of claim 1, wherein the line-side comprises an external modulator and a wavelength within a 1500 nm range.

14. The optical system of claim 1, wherein the line-side comprises optical signals with a center wavelength between 1519.48 nm to 1577.03 nm.

15. The optical system of claim 1, further comprising:
an optical combiner connected to the line-side and configured to multiplex the line-side with plural wavelengths in the wavelength division multiplexing system.

16. An optical networking system, comprising:
an optical transmission system comprising a client-side, $\lambda_{Ti}$, and a line-side, $\lambda_j$, with electrical signal processing between the client-side and the line-side, wherein $\lambda_{Ti}$ is different from $\lambda_j$ with each having a same information-bearing signal thereon; and
circuitry communicatively coupling the client-side and the line-side, wherein the circuitry is configured to re-shape, re-time, and/or re-amplify a signal there between,
wherein the client-side utilizes a wavelength of about 1300 to 1600 nm,
wherein the line-side is connected to a wavelength division multiplexing system and utilizes an external modulator and a wavelength within a 1500 nm range,
wherein the client-side comprises a first transmitter and a first receiver, and wherein the line-side comprises a second transmitter and a second receiver, and
wherein the second transmitter and the second receiver utilize quadrature amplitude modulation.

17. An optical networking system, comprising:
an optical transmission system comprising plural client-sides, $\lambda_{Ti}$, and plural line-sides, $\lambda_j$, with electrical signal processing between the plural client-sides and the plural line-sides, wherein $\lambda_{Ti}$ is different from $\lambda_j$ with each having a same information-bearing signal thereon;
circuitry communicatively coupling the plural client-sides and the plural line-sides, wherein the circuitry is configured to re-shape, re-time, and/or re-amplify a signal there between; and
an optical combiner connected to the plural line-sides and configured to multiplex wavelengths associated with each of the plural line-sides in a wavelength division multiplexing system,
wherein each of the plural client-sides utilize a wavelength of about 1300 to 1600 nm,
wherein each of the plural client-sides comprises a first transmitter and a first receiver and wherein each of the plural line-sides comprises a second transmitter and a second receiver, and
wherein the circuitry is further configured to frame an information-bearing signal between the client-side and the line-side with an OTN frame.

\* \* \* \* \*